United States Patent
Yamaoka

(10) Patent No.: US 11,416,188 B2
(45) Date of Patent: Aug. 16, 2022

(54) PRINTING APPARATUS AND NON-TRANSITORY COMPUTER-READABLE STORAGE MEDIUM STORING A COMPUTER PROGRAM

(71) Applicant: BROTHER KOGYO KABUSHIKI KAISHA, Nagoya (JP)

(72) Inventor: Hiroyuki Yamaoka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/144,068

(22) Filed: Jan. 7, 2021

(65) Prior Publication Data
US 2021/0208823 A1 Jul. 8, 2021

(30) Foreign Application Priority Data

Jan. 8, 2020 (JP) .............................. JP2020-001723

(51) Int. Cl.
G06F 3/12 (2006.01)

(52) U.S. Cl.
CPC .......... *G06F 3/1221* (2013.01); *G06F 3/1229* (2013.01); *G06F 3/1287* (2013.01)

(58) Field of Classification Search
CPC ..... G06F 3/1221; G06F 3/1229; G06F 3/1287
USPC ....................................................... 358/1.13
See application file for complete search history.

(56) References Cited

U.S. PATENT DOCUMENTS

| 7,456,981 | B2* | 11/2008 | Kuboki | H04N 1/32512 358/444 |
| 8,976,396 | B2* | 3/2015 | Hayakawa | G06F 3/1285 358/1.14 |
| 2012/0092721 | A1* | 4/2012 | Jaudon | G06F 3/1204 358/1.15 |
| 2015/0055160 | A1* | 2/2015 | Ito | H04N 1/00933 358/1.13 |
| 2019/0306115 | A1 | 10/2019 | Nishizaki | |

FOREIGN PATENT DOCUMENTS

| JP | H7-199739 A | 8/1995 |
| JP | 2019-179446 A | 10/2019 |

* cited by examiner

*Primary Examiner* — Allen H Nguyen
(74) *Attorney, Agent, or Firm* — Kenealy Vaidya LLP

(57) ABSTRACT

A printing apparatus including: a printing unit configured to perform printing on a printing medium; and a controller, wherein the printing apparatus is configured to perform communication with an external mediation apparatus configured to perform communication with a management server via the Internet, and wherein the controller is configured to: switch the printing apparatus to a dormant state in response to a predetermined time having elapsed since a specific operation mechanism of a plurality of operation mechanisms including the printing unit became anon-operating state, the printing apparatus being incapable of performing communication with the external mediation apparatus in the dormant state; execute periodic information processing including at least one of information transmission to the external mediation apparatus and information reception from the external mediation apparatus; and prohibit the switching of the printing apparatus to the dormant state during the executing of the periodic information processing.

13 Claims, 12 Drawing Sheets

FIG. 2

CORRESPONDENCE DATABASE

| DEVICE ID | GUID | LOCATION INFORMATION | FIRM VERSION | SETTING INFORMATION ||| | UPDATE DATE AND TIME | MANAGEMENT SITUATION INFORMATION |
| | | | | FONT | FONT SIZE | CONCENTRATION | ... | | |
|---|---|---|---|---|---|---|---|---|---|
| 001 | 00A | A BRANCH | 2 | GOTHIC | 14 | 3 | ... | 2018.04.01 | UNDER MANAGEMENT |
| 002 | 00A | A BRANCH | 3 | GOTHIC | 14 | 3 | ... | 2018.04.03 | UNDER MANAGEMENT |
| 003 | 00A | A BRANCH | 2 | GOTHIC | 14 | 3 | ... | 2018.04.02 | UNDER MANAGEMENT |
| 004 | 00B | B BRANCH | 2 | GOTHIC | 12 | 2 | ... | 2018.04.02 | UNDER MANAGEMENT |
| 005 | 00B | B BRANCH | 2 | GOTHIC | 12 | 2 | ... | 2018.04.03 | UNDER MANAGEMENT |
| 006 | 00C | C BRANCH | 2 | MINGCHO | 12 | 2 | ... | 2018.04.02 | UNDER MANAGEMENT |
| 007 | 00C | C BRANCH | 1 | MINGCHO | 14 | 3 | ... | 2018.04.02 | UNDER MANAGEMENT |
| 008 | 00C | C BRANCH | 2 | MINGCHO | 12 | 2 | ... | 2018.04.02 | UNDER MANAGEMENT |
| 009 | 00C | C BRANCH | - | - | - | - | ... | - | UNDER STANDBY |
| ... | ... | ... | ... | ... | ... | ... | ... | ... | ... |

FIG. 9

| TYPE OF PROCESSING | CONTENT OF PROCESSING EXECUTED IMMEDIATELY BEFORE | DORMANCY PROHIBITION TIME Ta [MINUTE] |
|---|---|---|
| Execution of Action | UPDATE OF SOFTWARE CONTENT (Install File) | 10 |
| | CHANGE OF SETTING (Apply Settings) | 3 |
| | PRINT (Print) | 5 |
| | RESTART | 0 |
| Update Device | CHANGE OF SETTING | 3 |
| | OCCURRENCE OF ERROR | 10 |
| | LOWERING IN REMAINING AMOUNT OF BATTERY | 0 |

FIG. 11

| TYPE OF PROCESSING | CONTENT OF PROCESSING EXECUTED IMMEDIATELY BEFORE | AUTONOMOUS RETURNING TIME Tr [MINUTE] |
|---|---|---|
| Execution of Action | UPDATE OF SOFTWARE CONTENT (Install File) | 1 |
| | CHANGE OF SETTING (Apply Settings) | 3 |
| | PRINT (Print) | 10 |
| | RESTART | 0 |
| Update Device | CHANGE OF SETTING | 3 |
| | OCCURRENCE OF ERROR | 1 |
| | LOWERING IN REMAINING AMOUNT OF BATTERY | 10 |

PRINTING APPARATUS AND NON-TRANSITORY COMPUTER-READABLE STORAGE MEDIUM STORING A COMPUTER PROGRAM

CROSS-REFERENCE TO RELATED APPLICATIONS

This application is based upon and claims the benefit of priority from prior Japanese patent application No. 2020-001723, filed on Jan. 8, 2020, the entire contents of which are incorporated herein by reference.

TECHNICAL FIELD

An aspect of the present disclosure relates to a printing apparatus configured to perform printing on a printing medium, and a non-transitory computer-readable storage medium storing a computer program that is executed a computer of an electronic device.

BACKGROUND ART

Known is an MDM (Mobile Device Management) system where a management server on the Internet performs communication with a mobile device to manage the mobile device. In related-art technology, an external mediation apparatus (Device Conductor) is communicatively connected to the management server configured to manage printers, via the Internet. An internal mediation apparatus is communicatively connected to the external mediation apparatus, and a printer that is the mobile device is configured to perform communication with the internal mediation apparatus via a local network.

In the meantime, known is technology of causing a printer apparatus to transit to a sleep mode in response to a predetermined time having elapsed since a specific operation mechanism of the printer apparatus became a non-operating state, with the main object of suppressing power consumption.

In recent years, instead of the configuration of the related-art technology where the internal mediation apparatus is used for information transfer between the printing apparatus, which is an electronic device, and the external mediation apparatus, proposed is a configuration where the printing apparatus is directly connected to the external mediation apparatus. In this case, management of the printing apparatus by the management server is performed via the external mediation apparatus. For this reason, the printing apparatus periodically performs information transmission to the external mediation apparatus and information reception from the external mediation apparatus. Specifically, the periodic processing includes, for example, inquiry processing of inquiring the external mediation apparatus whether there is a processing execution instruction to instruct execution of desired processing, instruction receiving processing of receiving the processing execution instruction from the external mediation apparatus, execution processing of executing processing corresponding to the processing execution instruction, result transmission processing of transmitting a processing execution result, and the like.

In the above configuration, it is considered to execute dormancy processing, as disclosed in related-art, with the main object of suppressing power consumption. In this case, however, since a dormant state of the printing apparatus is a state where the printing apparatus is incapable of performing communication with the external mediation apparatus, when the dormancy processing is executed upon execution of the periodic processing or during execution of the periodic processing, the above diverse periodic processing may not be normally executed. On the other hand, if the dormancy processing is unconditionally suppressed, the power consumption considerably increases.

SUMMARY

Aspects of the present disclosure provide a printing apparatus capable of suppressing an increase in power consumption to the minimum necessary while avoiding adverse effects of the dormancy processing and securely enabling a variety of periodic processing to be normally executed.

According to an aspect of the present disclosure, there is provided a printing apparatus including: a printing unit configured to perform printing on a printing medium; and a controller, wherein the printing apparatus is configured to perform communication with an external mediation apparatus configured to perform communication with a management server via the Internet, and wherein the controller is configured to: switch the printing apparatus to a dormant state in response to a predetermined time having elapsed since a specific operation mechanism of a plurality of operation mechanisms including the printing unit became a non-operating state, the printing apparatus being incapable of performing communication with the external mediation apparatus in the dormant state; execute periodic information processing including at least one of information transmission to the external mediation apparatus and information reception from the external mediation apparatus; and prohibit the switching of the printing apparatus to the dormant state during the executing of the periodic information processing.

The printing apparatus of the present disclosure is used in a so-called MDM (Mobile Device Management) system. That is, the external mediation apparatus (so-called Device Conductor) is communicatively connected to the management server configured to manage the printing apparatus, via the Internet, and the printing apparatus is communicatively connected to the external mediation apparatus.

According to another aspect of the present disclosure, there is provided a non-transitory computer-readable storage medium storing a computer program readable by a computer of an electronic device configured to perform communication with an external mediation apparatus configured to perform communication with a management server via the Internet, the computer program, when executed by the computer, causing the electronic device to perform: switching the electronic device to a dormant state in response to a predetermined time having elapsed since a specific operation mechanism of a plurality of operation mechanisms including a printing unit of the electronic device became a non-operating state, the electronic device being incapable of performing communication with the external mediation apparatus in the dormant state; executing periodic information processing including at least one of information transmission to the external mediation apparatus and information reception from the external mediation apparatus; and prohibiting the switching of the electronic device to the dormant state during the executing of the periodic information processing.

BRIEF DESCRIPTION OF DRAWINGS

FIG. 2 illustrates a correspondence database;

FIG. 9 is a table depicting an example where a predetermined time period Ta for extending the dormancy processing is set variable;

FIG. 11 is a table depicting an example where a predetermined time period Tr from dormancy to autonomous return is set variable.

DESCRIPTION OF EMBODIMENTS

An embodiment of the present disclosure will be described with reference to the drawings.

<System Outline>

Figure 1:
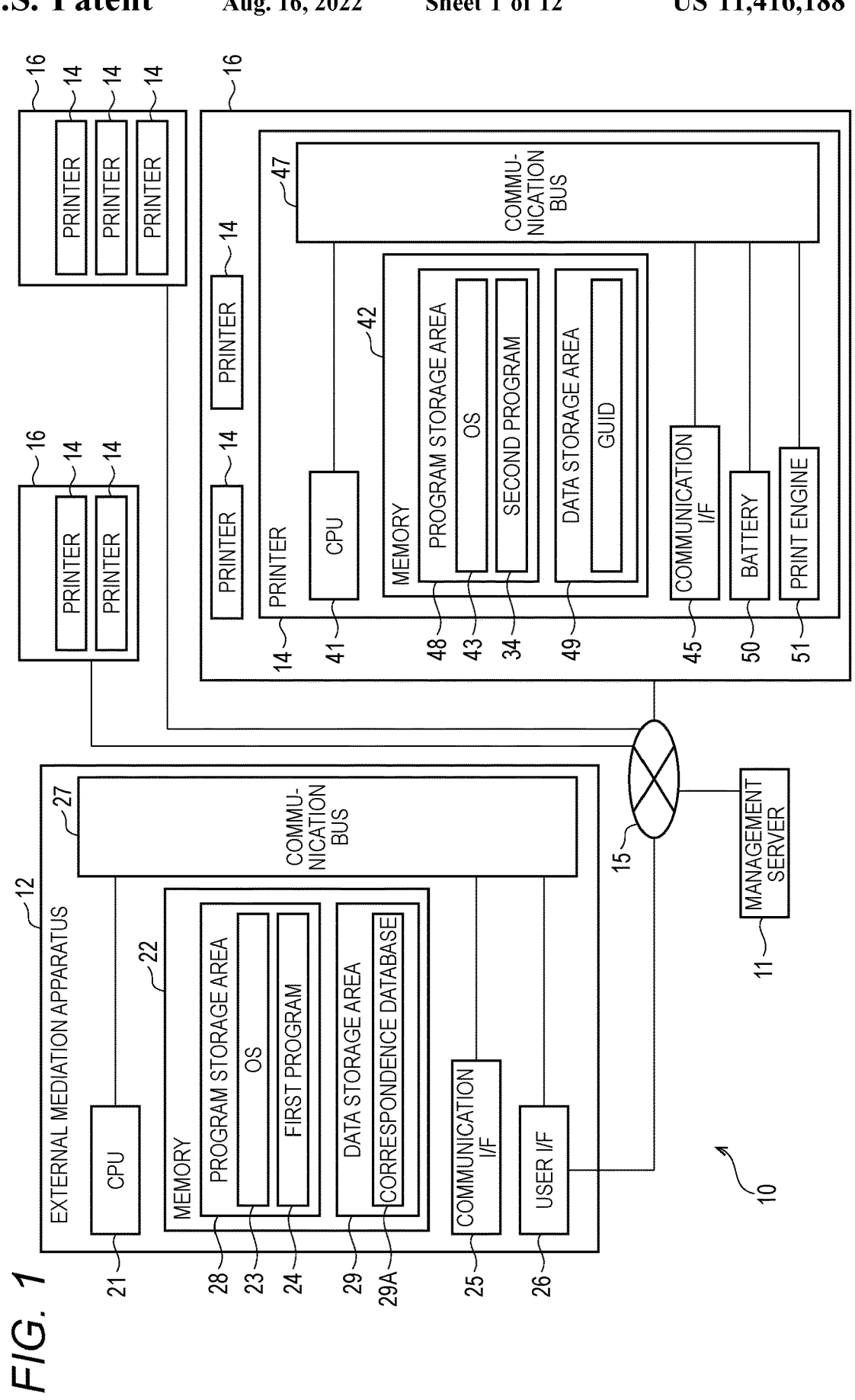
FIG. 1 is a schematic configuration view of a management system in accordance with an embodiment of the present disclosure.

In FIG. 1, a management system 10 of the present embodiment is a system configured to manage a printer 14 by using a so-called mobile device management system. An administrator of the printer 14 browses management information of the printer 14 stored in the management server 11 by using a browser or instructs the printer 14 to change setting information, for example, through the management server 11.

Also, the management system 10 is a system configured to manage a printer 14 having no function of directly performing communication with the management server 11. An external mediation apparatus 12 is used so that the management server 11 can manage the printer 14 having no function of directly performing communication with the management server 11. The printer 14 is an example of the printing apparatus, and is also an example of the electronic device.

The management system 10 includes the management server 11 and the external mediation apparatus 12, which are connected to the Internet 15, and the printer 14 connected to a local network 16.

The management server 11 is a server of a company that provides service to manage mobile devices, for example. The external mediation apparatus 12 is a server of a company that receives the service to manage mobile devices, for example. The local network 16 is established at each branch of the company that receives the service to manage mobile devices, for example. Each branch has one or more printers 14, and the printers 14 at each branch are each connected to the local network 16 at each branch.

In the shown example, the three local networks 16 are established, and the two or three printers 14 are connected to each local network 16. Note that, the number of the local networks 16 in the management system 10 and the number of the printers 4 connected to each local network 16 are not limited to the shown example.

The management server 11 and the external mediation apparatus 12 can perform communication with each other via the Internet 15. Specifically, the management server 11 and the external mediation apparatus 12 each have a global IP address, and perform communication with each other by using Internet protocols using the global IP addresses.

The local network 16 is a so-called intranet, and is, for example, a wired LAN, a wireless LAN, a WAN, or a combination thereof. The printers 14 connected to the local network 16 can perform communication with each other by using a communication protocol such as TCP/IP. Specifically, the printers 14 perform communication with each other by using private IP addresses or MAC addresses.

The local network 16 includes a relay apparatus (not shown) such as a router. The relay apparatus has a global IP address, and is connected to the Internet 15. The printer 14 connected to the local network 16 performs communication with the external mediation apparatus 12 via the relay apparatus. Specifically, the printer 14 and the external mediation apparatus 12 perform communication with each other through a firewall established by the relay apparatus. Note that, the firewall is not necessarily required. That is, in a case where the firewall is not necessary or is less necessary, the relay apparatus may not have the firewall.

The management system 10 is a system that enables management of the printer 14 having no function of directly performing communication with the management server 11 to be implemented in the management server 11 by using the external mediation apparatus 12 configured as described above. Specifically, the management of the printer 14 having no function of directly performing communication with the management server 11 is implemented using a first program 24 that is installed and executed in the external mediation apparatus 12 and a second program 34 that is installed and executed in the printer 14. That is, the management of the printer 14 having no function of directly performing communication with the management server 11 by the management server 11 is implemented by the first program 24 and the second program 34. In the below, the configurations of the external mediation apparatus 12 and the printer 14 are described in detail.

<External Mediation Apparatus (Part 1)>

The external mediation apparatus 12 includes a CPU 21, a memory 22, a communication interface 25 (hereinbelow, referred to as "communication I/F 25"), a user I/F 26, and a communication bus 27. The CPU 21, the memory 22, the communication I/F 25, and the user I/F 26 are connected to the communication bus 27.

The memory 22 is a ROM, a RAM, an EEPROM, an a portable storage medium such as a USB memory, or a buffer provided in the CPU 21. The memory 22 may also be a computer-readable storage medium. The computer-readable storage medium is a non-transitory medium. The non-transitory includes also recording media such as a CD-ROM, a DVD-ROM and the like, in addition to the above example. Also, the non-transitory medium is a tangible medium. Note that, an electric signal for carrying a program that is downloaded from a server or the like on the Internet is a computer-readable signal medium that is a kind of the computer-readable medium but is not included in the non-transitory computer-readable storage medium. The same holds true for a memory 42 of the printer 14, which will be described later.

The memory 22 has a program storage area 28 and a data storage area 29. In the program storage area 28, programs such as an OS 23, the first program 24 and the like are stored.

The OS 23 is a basic program of the external mediation apparatus 12. The OS 23 is an operating system such as MacOS (registered trademark), Windows (registered trademark), Linux (registered trademark), Android (registered trademark) OS and the like.

The first program 24 is a program for controlling communication with the management server 11 and the printer 14 via the communication I/F 25 in cooperation with the OS 23. The first program 24 may be a single program or a group of a plurality of programs. The processing that is executed by the first program 24 will be described later.

In the data storage area 29, data necessary for execution of the programs are stored. Also, in the data storage area 29, a correspondence database shown in FIG. 2 is stored.

<Correspondence Database>

In FIG. 2, a correspondence database has a plurality of items and a plurality of records. In the present example, the plurality of items includes items "device ID", "GUID", "location information", "firm version", "setting information", "update date and time", and "management situation information". Note that, the correspondence database may also include items other than the above-described items.

The item "device ID" is an ID allotted to the printer 14. The device ID is, for example, a MAC address, an IP address, a serial number or the like of the printer 14. Each record is identified by the device ID. That is, one record is generated for one printer 14.

The item "GUID" indicates a GUID allotted to the second program 34 (which will be described later) provided in the printer 14. Note that, as the GUID, any GUID such as numbers, characters and the like can be used inasmuch as it can identify the second program 34. The same holds true for the device ID.

The item "location information" indicates the local network 16 to which the printer 14 having the second program 34 indicated by the item "GUID" belongs. The item "location information" is, for example, a branch name, a branch office name or the like.

The item "firm version" indicates a version of the second program 34 (which will be described later) installed in the printer 14. Note that, the larger number of the item "firm version" indicates a newer version.

The item "setting information" has a plurality of subdivided items such as an item "font", an item "font size", an item "concentration" and the like. The item "font" means a font of characters that are printed by the printer 14. The item "font size" means a size of characters that are printed by the printer 14. The item "concentration" means a concentration of ink of characters and figures that are printed by the printer 14. The item "setting information" may also have other items such as an item indicating whether an automatic power supply-off function is valid or invalid, an item indicating a printing speed, an item indicating setting parameters of communication, and the like, in addition to the above-described items.

The item "update date and time" indicates date and time when a content indicated by each item in the record is changed.

The item "management situation information" indicates whether the printer 14 of each record is a management target by the management system 10. "Under management" means that the printer 14 is a management target by the management system 10. "Under standby" means that the printer 14 is not a management target by the management system 10.

<External Mediation Apparatus (Part 2)>

Returning to FIG. 1, the communication I/F 25 of the external mediation apparatus 12 is an interface capable of performing communication with the management server 11 and the printer 14. The communication I/F 25 is a LAN I/F and a wireless LAN I/F. The external mediation apparatus 12 and the printer 14 perform communication with each other via the communication IN 25, the Internet 15, the firewall (relay apparatus), the local network 16, and a communication I/F 45.

The user I/F 26 is, for example, a keyboard, a mouse and the like, and is configured to receive an administrator's input.

<Printer>

The printer 14 includes a CPU 41, a memory 42, a communication I/F 45, a battery 50, a print engine 51, and a communication bus 47. Note that, the print engine is an example of the printing unit, and the CPU 41 is an example of the controller, and is also an example of the computer. The configurations of the CPU 41, the memory 42, the communication I/F 45, and the communication bus 47 are similar to those of the CPU 21, the memory 22, the communication I/F 25, and the communication bus 27 of the external mediation apparatus 12.

The memory 42 has a program storage area 48 and a data storage area 49. In the program storage area 48, programs such as an OS 43, a second program 34 and the like are stored. In the data storage area 49, data necessary for execution of the programs are stored. Also, in the data storage area 49, a device ID and a GUID (Globally Unique Identifier) are stored. The device ID is, for example, a MAC address, a private IP address, a serial number or the like of the printer 14.

The OS 43 is a basic program of the printer 14. The second program 34 is a program for causing the print engine 51 to perform printing on an appropriate printing medium and controlling communication with the external mediation apparatus 12 via, the communication I/F 45 in cooperation with the OS 43. The second program 34 may be a single program or a group of a plurality of programs. The processing that is executed by the second program 34 will be described later.

The communication I/F 45 is an interface capable of performing communication with the external mediation apparatus 12. The communication I/F 45 is configured to receive a command transmitted from the external mediation apparatus 12, and to transmit a response to the command to the external mediation apparatus 12.

The battery 50 is, for example, a secondary battery that can be charged and discharged. In a case where the printer 14 is connected to a commercial power supply, the battery 50 is charged by the commercial power supply, and in a case where the printer 14 is not connected to a commercial power supply, the battery is discharged, thereby supplying drive power to the print engine 51 and the CPU 41.

<Processing of Programs>

In the below, processing that is executed by the first program 24 and the second program 34 is described.

In the present specification, the processing of the CPU that is executed according to commands described in programs is mainly described. That is, in descriptions below the processing such as "determination", "extraction", "selection", "calculation", "decision", "specifying", "acquisition", "receiving", "control", "setting" and the like indicates the processing of the CPU. The processing that is executed by the CPU includes hardware control via a controller such as an OS. Note that, "acquisition" is used as a concept that does not necessarily require a request. That is, processing of receiving data without a request of the CPU is also included in the concept that "the CPU acquires data". The processing such as "command", "response", "request" and the like is performed by communicating information indicative of "command", "response", "request" and the like. Also, words such as "command", "response", "request" and the like may be described as meanings of information indicative of "command", "response", "request" and the like.

Also, the processing of the CPU that is executed according to commands described in programs may be described in abbreviated words, such as "the CPU 21 performs", "the program 24 performs", "the external mediation apparatus 12 performs", and the like. The same holds true for the CPU 41. Also, the processing of inputting and outputting information by the program via the communication I/F and the user I/F may be described in abbreviated words, such as "the CPU 21 receives", "the program 24 transmits", "the external mediation apparatus 12 acquires", and the like.

Also, in the present specification, "data" and "information" are common in that they are bits or bit strings that can be treated by a computer. "Data" indicates that semantic content expressed by each bit can be treated without the computer considering the same. In contrast, "information" indicates that operations of the computer are branched by semantic content expressed by each bit. Note that, "data" of different formats are treated as the same data when the semantic content of the data is substantially the same. The same holds true for "information". Also, "instruction" is a control signal for urging a device of a transmission destination to perform a next operation, and may include information or "instruction" itself may have a nature of information.

Also, "data" and "information" are treated as the same data and information inasmuch as the semantic content thereof is recognized as the same, even though a format (for example, a text format, a binary format, a flag format and the like) thereof is changed for each computer. For example, information indicative of "two" may be held as information of a text format such as ASCII code "0x32" in some computers, and may be held as information of a binary format such as a binary number indication "10" in other computers.

However, the "data" and the "information" are not strictly distinguished and may be treated exceptionally. For example, the data may be temporarily treated as the information, and the information may be temporarily treated as the data. Also, the data treated in one device may be treated as the information in another device. Furthermore, the information may be taken out from the data, and the data may be taken out from the information.

<Basic Processing Contents of Programs>

In the below, processing that is executed by the first program 24 of the external mediation apparatus 12 and the second program 34 of the printer 14 is described with reference to FIGS. 3 to 6B. Although described in detail later, when transmitting and receiving information between the external mediation apparatus 12 and the printer 14, the external mediation apparatus 12 basically transmits information such as an instruction to the printer 14, in a form of being included in an HTTP response to an HTTP request received from the printer 14. For this reason, the printer 14 periodically transmits the HTTP request to the external mediation apparatus 12. Note that, the firewall blocks transmission from the external mediation apparatus 12 to the printer 14, except the HTTP response to the HTTP request transmitted from the printer 14.

<Registration of Printer>

Figure 3:
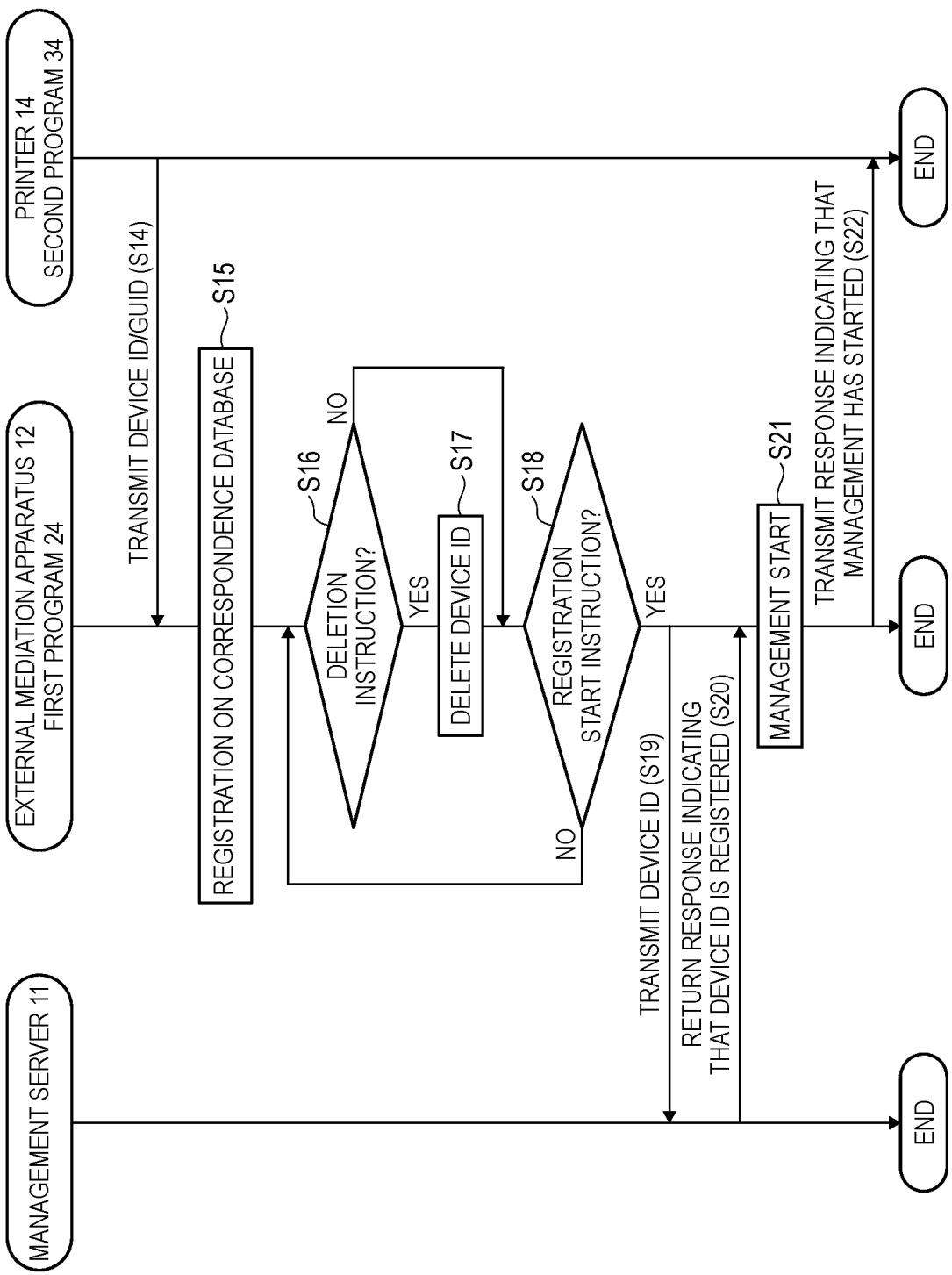
FIG. 3 depicts processing that is executed in the management server, an external mediation apparatus, and a printer when registering the printer on the management server.

First, processing of registering the device ID of the printer 14 on the correspondence database stored in the memory 22 of the external mediation apparatus 12 and starting management of the management system 10 is described with reference to FIG. 3.

First, in a case where the second program 34 is activated for the first time and initial setting of the second program 34 is executed, or according to a registration instruction input by a person in charge and instructing the printer 14 that is a management target to be registered on the management system 10 or in a case where a registration instruction transmitted from the first program 24 of the external mediation apparatus 12 is received, for example, the second program 34 of the printer 14 transmits an HTTP request, which includes a device ID of the printer and a GUID of the second program stored in the memory 32, to the external mediation apparatus 12 (step S14). Note that, in the specification, the "person in charge" is, for example, a person who manages the printer 14 at each branch and is different from an administrator who operates the external mediation apparatus 12.

The HTTP request transmitted from the second program 34 of the printer 14 and including the device ID and the GUID is received by the external mediation apparatus 12 (step S14). When the device ID and the GUID are received, the first program 24 of the external mediation apparatus 12 determines whether the received device ID is registered already on the correspondence database. When it is determined that the received device ID is not registered, the first program 24 registers a new record on the correspondence database by using the received device ID and GUID (step S15).

Although not shown in the flowchart, the first program 24 of the external mediation apparatus 12 returns an HTTP response including a response indicating that the device ID is received to the printer 14, as a response to the HTTP received in step S14. Alternatively, the first program 24 of the external mediation apparatus 12 may return an HTTP response including the device ID registered on the correspondence database to the printer 14, as a response to the HTTP received in step S14.

At this time, in the record newly added to the database as described above, "under standby" that is an initial value is stored in the item "management situation information". In the example of FIG. 2, the record indicative of the printer 14 having the device ID "009" is the newly added record. The printer 14 indicated by the record that is "under standby" is not registered yet on the management server 11. That is, it can be said that the corresponding printer is in a temporarily registered state where it is not set as a management target of the management system 10. Note that, in the record indicative of the printer 14 set as a management target, the "management situation information" is changed from "under standby" to "under management".

On the other hand, when it is determined that the received device ID is registered already on the correspondence database, the first program 24 of the external mediation apparatus 12 returns a response, which indicates that the received device ID is registered already on the correspondence database, to the printer 14.

Returning to FIG. 3, the first program 24 of the external mediation apparatus 12 determines whether a deletion instruction is input (step S16). The deletion instruction is, for example, an instruction that is input to the external mediation apparatus 12 by the administrator. For example, the first program 24 displays on a display of the external mediation apparatus 12 that a record is generated and is registered on the correspondence database. The administrator who checks the display displays the correspondence database on the display of the external mediation apparatus 12, and determines whether the printer 14 indicated by the device ID that is "under standby" is a printer 14 that is a management target. The administrator inputs the deletion instruction for the device ID of the printer 14 that is not a target to be managed by the management system 10. That is, it is checked whether the device ID registered on the correspondence database is appropriate by the administrator of the external mediation apparatus 12.

When it is determined that the deletion instruction is input (step S16: Yes), the first program 24 of the external mediation apparatus 12 deletes a record for which the deletion instruction is input from the correspondence database (step S17). On the other hand, when it is determined that the deletion instruction is not input, the first program 24 of the external mediation apparatus 12 skips over the processing of step S17.

Then, the first program 24 of the external mediation apparatus 12 stands by until a management start instruction to start management of the management system 10 is input (step S18: No). When it is determined that the management start instruction is input (step S18: Yes), the first program 24 transmits a command to the management server 11 (step S19). The command includes the device ID registered on the correspondence database, as ancillary information. Also, the command is a command to request the management server 11 to register the included device ID, as the device ID of the printer 14 that is a management target.

Note that, the first program 24 of the external mediation apparatus 12 may receive an input of an ins suction to reject the management start, in step S18. In this case, in step S22, the first program 24 transmits an HTTP response, which indicates that an instruction to reject the management start is input, to the second program 34 of the printer 14. In a case where the HTTP response is received, the second program 34 displays information, which indicates that the instruction to reject the management start is input to the external mediation apparatus 12, on the display of the printer 14, for example. The person in charge can check by the displayed information that the instruction to reject the management start is input to the external mediation apparatus 12.

The command transmitted by the external mediation apparatus 12 is received by the management server 11 (step S19). The management server 11 that receives the command stores the device ID included in the received command in a memory (not shown). That is, the management server 11 registers the device ID included in the received command, as the device ID of the printer 14 that is a management target. Then, the management server 11 returns a response, which indicates that the device ID included in the command is registered, to the external mediation apparatus 12 via the Internet 15 (step S20).

The response returned by the management server 11 is received by the external mediation apparatus 12 (step S20). In a case where the response from the management server 11 is received, the first program 24 of the external mediation apparatus 12 starts management of the management system 10 (step S21). Specifically, the first program 24 changes the item "management situation information" in the database shown in FIG. 2 from "under standby" to "under management".

Then, the first program 24 of the external mediation apparatus 12 transmits the device ID that is "under management", i.e., the device ID of the printer 14 for which management has started to the printer 14, as an HTTP response to the HTTP request periodically transmitted by the printer 14 (step S22). At this time, the device ID deleted in S17 is not transmitted.

Note that, the first program 24 of the external mediation apparatus 12 may transmit the HTTP response in step S22 to the printer 14, as a response to the HTTP request received in step S14. In this case, the processing of step S16 and step S17 is preferably omitted so that a timeout does not occur.

Although not shown in the flowchart, when the device ID for which management has started is received (step S22), the second program 34 of the printer 14 stores the device ID for which management has started in the memory 42. The second program 34 displays, on the display of the printer 14, for example, that the device ID for which management has started is received, thereby causing the person in charge to recognize the same. The person in charge can display the device ID stored in the memory 42 on the display of the printer 14 and check that management for the printer 14 has started. Note that, the administrator of the external mediation apparatus 12 can check the printer 14 for which management has started by displaying the correspondence database stored in the memory 22 on the display of the external mediation apparatus 12. Also, the administrator of the external mediation apparatus 12 can check the printer 14 for which management has started by displaying data stored in the management server 11 on the display with a browser.

<Processing That Is Executed by instruction From Management Server (Other Than Status Reporting)>

Subsequently, a command corresponding to an instruction from the management server 11 is input to the printer 14 having a device ID of a record in which the item "management situation information" is "under management". That is, the printer 14 is managed by the management server 11. The management is described in detail with reference to FIGS. 4 and 5. Note that, an instruction to the management server 11 is input to the management server 11 by the administrator with a browser.

First, the management server 11 transmits a first instruction command to the external mediation apparatus 12, via the Internet 15 (step S31). The first instruction command is a command for causing the external mediation apparatus 12 to execute an instruction corresponding to an instruction that is executed by the printer 14. The first instruction command includes a device ID for specifying the printer 14 that is caused to execute the instruction, as ancillary information.

In the present example, the first instruction command is an instruction for causing the printer 14 to execute desired printing, an instruction for changing setting values of the printer 14 with respect to each item of "font", "font size", "concentration" and the like of the setting information (FIG. 2), an instruction to update a firm version (FIG. 2) of the second program 34 of the printer 14, and the like, and the like, for example. Note that, the contents instructed by the first instruction command are not limited to the above examples.

The first program 24 of the external mediation apparatus 12 receives the first instruction command transmitted from the management server 11 (step S31).

In a care where the first instruction command is received (step S31), the first program 24 of the external mediation apparatus 12 transmits a notification, which indicates that the first instruction command is received, to the management server 11 (step S32).

When the first instruction command is received (step S31), the first program 24 of the external mediation apparatus 12 specifies a GUID associated with the device ID included in the first instruction command, from the correspondence database. That is, the first program 24 specifies the second program 34 of the printer 14 to which the instruction is to be transmitted by the GUID. Specifically, the first program 24 specifies a record having the device ID included in the first instruction command, from the correspondence database, and specifies a GUID of the item "GUID" in the specified record, as a corresponding GUID.

Then, the first program 24 of the external mediation apparatus 12 generates a second instruction command corresponding to an instruction of the first instruction command (step S34). The second instruction command is a command that can be input to the printer 14 and is generated according to a content instructed by the first instruction command. The second instruction command includes the device ID included in the first instruction command, as ancillary information.

Although not shown in FIG. 2, in the data storage area 29 of the memory 22 of the external mediation apparatus 12, a first command list is stored. The first command list shows a correspondence between the first instruction command and the second instruction command. The first program 24 of the external mediation apparatus 12 generates a second instruction command by deciding a second instruction command corresponding to the first instruction command received in step S31 from the first command list, and including the device ID included in the first instruction command in the decided second instruction command, as ancillary information (step S34).

Also, although not shown, when an instruction indicated by the first instruction command is file transmission to the printer 14, the first program 24 of the external mediation apparatus 12 requests a file of a transmission target from the management server 11. The management server 11 that receives the request transmits a file to the external mediation apparatus 12. The first program 24 receives and stores the file in the memory 22. For example, a file in which a text to instruct the printer 14 to change a setting is included, a program file of the second program 34 of a new version, and the like are examples of the file of the transmission target. When the file is received from the management server 11, the first program 24 generates a second instruction command to instruct the second program of the printer 14 to download the file, in step S34.

After generating the second instruction command, the first program 24 of the external mediation apparatus 12 stands by until an HTTP request is received from the printer 14.

In the meantime, the second program 34 of the printer 14 initializes a dormancy prohibition flag Fs and an execution history flag Fa to 0 (step S1), and determines whether it comes a transmission timing stored in advance in the memory 32 has come (step S35). The dormancy prohibition flag Fs and the execution history flag Fa will be described in detail later. Also, the transmission timing is set as an interval of several seconds to tens of seconds such as an interval of 10 seconds, an interval of 15 seconds, an interval of 20 seconds, and the like, for example.

When it is determined that the transmission timing has come (step S35: Yes), the second program 34 of the printer 14 sets the dormancy prohibition flag Fs to 1 (step S2). Although described in detail later with reference to FIG. 7, while the dormancy prohibition flag Fs is 1, the dormancy is not performed even when a non-operating time of the printer 14 continues for a predetermined time period. Thereafter, the second program 34 of the printer 14 transmits an HTTP request including a GUM thereof to the external mediation apparatus 12 (step S36). This request is also referred to as "GetAction", and is to inquire of the external mediation apparatus 12 whether there is a processing execution instruction to instruct the printer 14 to execute desired processing, as described later. The processing that is executed in step S36 is an example of the inquiring of whether there is a processing execution instruction. The processing that is executed in step S36 is also referred to as inquiry processing. That is, as described above, due to the dormancy prohibition flag Fs being set to 1, the dormancy is prohibited at least after the inquiring is executed.

The first program 24 of the external mediation apparatus 12 receives the HTTP request transmitted from the printer 14 (step S36). The first program 24 determines whether the GUID included in the received HTTP request coincides with the GUID decided in step S33 (step S37). That is, the first program 24 determines whether the printer 14 that transmits the HTTP request is the printer 14 to which the second instruction command generated in step S34 is to be transmitted.

When it is determined that the GUID included in the HTTP request received in step S36 does not coincide with the GUID decided in step S33 (step S37: No), the first program 24 of the external mediation apparatus 12 transmits an HTTP response that does not include a second instruction command (step S38). The HTTP response transmitted in step S38 indicates only that the HTTP request transmitted in step S36 is received.

On the other hand, when it is determined that the GUID included in the HTTP request received in step S36 coincides with the GUID decided in step S33 (step S37: Yes), the first program 24 of the external mediation apparatus 12 transmits an HTTP response that includes a second instruction command (step S39). That is, the external mediation apparatus 12 includes the second instruction command in the HTTP response to the HTTP request from the printer 14, and transmits the second instruction command to the printer 14 via the firewall. This response is also referred to as "BrActionInfo", and is an example of the processing execution instruction to instruct the printer 14 to execute desired processing. Also, at this time, the external mediation apparatus 12 includes a list in which instruction completion of processing execution is recorded. The first program 24 of the external mediation apparatus 12 records that execution of corresponding processing is completed by the second instruction command in the list when the second instruction command is transmitted as described above.

The second program 34 of the printer 14 receives the HTTP response transmitted from the external mediation apparatus 12 (step S38, step S39). Note that, the processing that is executed in step S39 is an example of the receiving of the processing execution instruction. The processing executed in step S39 is also referred to as instruction receiving processing. The second program 34 determines whether a second instruction command is included in the received HTTP response (step S40). When it is determined that the second instruction command is not included in the received HTTP response (step S40: No), the second program 34 returns to step S35 and continues to periodically transmit the HTTP request.

Although not shown in the flowchart, in a case where the second instruction command received in step S39 is a command indicating download of a file, the second program 34 of the printer 14 transmits an HTTP request, which includes a request for transmission of a file, to the external mediation apparatus 12. The first program 24 of the external mediation apparatus 12 that receives the HTTP request transmits an HTTP response including a file to the printer 14, in response to a command included in the HTTP request. The second program 34 of the printer 14 receives the file included in the HTTP response. Note that, the file may also be transmitted with being included in the second instruction command. In this case, the request for transmission of a file is not transmitted from the second program 34 to the first program 24.

Note that, the second program 34 of the printer 14 may determine whether an instruction indicated by the second instruction command received in step S39 is a change of setting information, an update of the firm version or an acquisition of the status information (which corresponds to a case to be described later), based on a status request flag attached to the second instruction command. For example, in a case where the first instruction command received in step S31 is an instruction to request the status information, the first program 24 of the external mediation apparatus 12 attaches a status request flag set to "ON" to the second instruction command.

On the other hand, when it is determined that the second instruction command is included in the received HTTP response (step S40: Yes), the second program 34 of the printer 14 transmits an HTTP request including a notification (hereinbelow, also referred to as "reception notification") indicting that the second instruction command is received to the external mediation apparatus 12 (step S41). This response is also referred to as "DeleteDevice". The first program 24 of the external mediation apparatus 12 receives the HTTP request including the reception notification (step S41). That is, the second program 34 notifies the external mediation apparatus 12 that the second instruction command is received. This notification has following meanings.

That is, although not shown in the flowchart, when it is determined that the HTTP request including the reception notification is not received within a predetermined time, the first program 24 retransmits the second instruction command to the printer 14, as an HTTP response to the HTTP request that is periodically transmitted from the printer 14. In a case where the HTTP request including the reception notification is received, the first program 24 returns an HTTP response, which indicates that the reception notification is received, to the printer 14.

That is, unless the reception notification is received, the second program 34 of the printer 14 cannot determine whether the printer 14 has received the second instruction command until a response (refer to step S55 and S62, which will be described later) corresponding to the second instruction command is received. As a result, a time until a response corresponding to the second instruction command is received exceeds a predetermined time defined as a time until the second instruction command is retransmitted, so that even though the printer 14 receives the second instruction command, the external mediation apparatus 12 may retransmit the second instruction command. Therefore, the second program 34 of the printer 14 transmits the reception notification to the external mediation apparatus 12 (step S41) before transmitting a response (step S55 and S62) corresponding to the second instruction command. Thereby, it is possible to prevent a situation where even though the printer 14 has received the second instruction command, the external mediation apparatus 12 retransmits the second instruction command.

Although not shown in the flowchart, when the HTTP request transmitted from the printer 14 is received, the first program 24 of the external mediation apparatus 12 deletes the recording of the corresponding second instruction command from the list. Then, the first program 24 transmits a notification, which indicates that the recording of the corresponding second instruction command is deleted, to the printer 14, This response is also referred to as "BrResponseBasicInfo".

After executing the processing of step S41, the second program 34 of the printer 14 executes an instruction indicated by the second instruction command (step S52). For example, in a case where the second instruction command is an instruction for causing the printer 14 to execute desired printing, the second program 34 causes the print engine 51 to execute printing on the printing medium. Also, in a case where the second instruction command is an instruction to change the setting of the printer 14 with respect to each item of "font", "font size", "concentration" and the like of the setting information (FIG. 2), the second program 34 changes the setting values of "font", "font size", "concentration" and the like to setting values included in the second instruction command. Also, in a case where the second instruction command is an instruction to update the firm version, the second program 34 updates the second program by a program included in the second instruction command. The processing in step S52 is an example of the executing of processing corresponding to the received processing execution instruction, is also referred to as "Execution of Action", and is to execute processing corresponding to the processing execution instruction received in the instruction receiving processing. The processing in step S52 is also referred to as execution processing. That is, the dormancy prohibition flag Fs is set to 1 from step S39 to step S52, so that the dormancy is prohibited at least during the instruction receiving processing and the execution processing.

Then, the second program 34 of the printer 14 determines whether the second program 34 itself executed the instruction indicated by the second instruction command (step S54).

In a case where it is determined that the instruction indicated by the second instruction command is not executed (step S54: No), the second program 34 transmits an HTTP request including first error information to the external mediation apparatus 12 (step S55). Note that, the HTTP request transmitted at this time may be an HTTP request that is periodically transmitted from the printer 14 to the external mediation apparatus 12 or may be an HTTP request that is transmitted separately from the HTTP request periodically transmitted.

In the meantime, although not shown in FIG. 2, in the data storage area 49 of the memory 42 of the printer 14, a first error correspondence list showing a correspondence between the first error code and a content of an error is stored. The second program 34 of the printer 14 decides a first error code corresponding to a content of an error from the first error correspondence list, generates first error information including the decided first error code and the device ID and transmits an HTTP request including the generated first error information (step S55).

The transmitted first error information is received by the external mediation apparatus 12 (step S55). The first program 24 of the external mediation apparatus 12 generates second error information, based on the received first error information (step S56). The second error information includes a second error code having a format that can be recognized by the management server 11. Although not shown in FIG. 2, in the data storage area 29 of the memory 22 of the external mediation apparatus 12, a second error correspondence list showing a correspondence between the first error code and the second error code is stored. The first program 24 decides a second error code corresponding to the first error code from the second error correspondence list, and generates second error information including the decided second error code and the device ID included in the first error information (step S56).

The first program 24 of the external mediation apparatus 12 transmits the second error information generated in step S56 to the management server 11, as a response to the received first instruction command (step S31) (step S57). The transmitted second error information is received by the management server 11 (step S57). When the second error information is received, the management server 11 transmits a reception response indicating that the second error information is received. The transmitted reception response is received by the external mediation apparatus 12 (step S58).

On the other hand, in a case where it is determined in step S54 that the printer 14 has executed the content instructed by the second instruction command (step S54: Yes), the second program 34 of the printer 14 sets the execution history flag Fa to 1 (step S3), and then stands by until the transmission timing at which the HTTP request is periodically transmitted comes (step S61: No). When it is determined that the transmission timing has come (step S61: Yes), the second program 34 transmits an HTTP request including the status information after executing the content instructed by the second instruction command in step S52 to the external mediation apparatus 12, as a response to the second instruction command received in step S39 (step S62). At this time, the status information is the setting information, the firm version and the like. This request is also referred to as "EnrollNotification", and is to transmit a result of the processing execution in the execution processing. The processing that is executed in step S62 is an example of the transmitting of the execution result. The processing that is executed in step S62 is also referred to as result transmission processing. After transmitting the request in step S62, the second program 34 of the printer 14 returns the dormancy prohibition flag Fs to 0 (step S4). That is, the dormancy prohibition flag Fs is kept as 1 until the processing of step S62 is executed, so that the dormancy is prohibited at least up to the timing at which the result transmission processing is executed.

Although not shown in the flowchart, after receiving the HTTP request including the status information (step S62), the first program 24 of the external mediation apparatus 12 transmits information, which indicates that the HTTP request is received, to the printer 14, as an HTTP response to the HTTP request. This response is also referred to as "BrResponseBasicInfo".

The status information is included in the HTTP request that is periodically transmitted from the printer 14 to the external mediation apparatus 12, as described above, so that it is possible to reduce the number of communication times between the printer 14 and the external mediation apparatus 12, as compared to a case where the status information is transmitted separately from the HTTP request that is periodically transmitted. Note that, the second program 34 may include the status information after change in an HTTP request separate from the HTTP request that is periodically transmitted, and may transmit the HTTP request to the external mediation apparatus 12. In this case, as compared to a case where the status information is included in the HTTP request that is periodically transmitted, it is possible to transmit more rapidly the status information to the external mediation apparatus 12.

The first program 24 of the external mediation apparatus 12 receives the status information after change, as a response to the second instruction command (step S62). When the status information is received, the first program 24 overwrites the values of the setting information, the firm version and the like of the correspondence database (FIG. 2) with the received status information (step S63).

Then, the first program 24 of the external mediation apparatus 12 generates setting completion information, which includes information indicating that the instruction indicated by the first instruction command is executed by the printer 14 and the status information received in step S62. Then, the first program 24 transmits the generated setting completion information to the management server 11, as a response to the first instruction command received in step S31 (step S64). The setting completion information is, for example, a command that can be input to the management server 11 and has the status information as ancillary information. Note that, the first program 24 of the external mediation apparatus 12 may transmit the status information received in S62 to the management server 11, separately from the setting completion information. That is, the information indicating that the setting is made, and the status information after setting may be separately transmitted to the management server 11.

When the setting completion information is received via the Internet 15 (step S64), the management server 11 transmits a reception response, which indicates that the setting completion information is received, to the external mediation apparatus 12 (step S65). The first program 24 of the external mediation apparatus 12 receives the reception response transmitted from the management server 11 (step S65), and ends the processing.

<Periodic Status Reporting Without Instruction From Management Server>

In the above, the processing that is executed by the first program 24 of the external mediation apparatus 12 and the second program 34 of the printer 14 according to the first instruction command from the management server 11 has been described. In the below, processing in which the first program 24 of the external mediation apparatus 12 and the second program 34 of the printer 14 periodically transmit the status information of the printer 14 irrespective of an instruction from the management server 11 is described with reference to FIGS. 6A and 6B.

First, the second program 34 of the printer 14 initializes the dormancy prohibition flag Fs and the execution history flag Fa to 0 (step S5), and stands by until a periodic status acquisition timing comes (step S71: No). The periodic status acquisition timing is every one hour, every 12 hours, every 24 hours, and the like, for example. That is, the periodic status acquisition timing is set to be longer than the transmission timing of periodically transmitting the HTTP request. The reason is described. When the printer 14 is caused to execute processing of returning the status information, power is consumed in the printer 14. Therefore, in a case where the periodic status acquisition timing is set to a timing of a second unit or a minute unit, consumption of the battery 50 increases. However, when the periodic status acquisition timing is set to an hour unit such as one hour, 12 hours, 24 hours or the like, the consumption of the battery 50 can be suppressed.

Also, setting the periodic status acquisition timing to an hour unit has other meanings, as follows. That is, as described later, the second program 34 of the printer 14 has a dormancy function, i.e., so-called sleep function of stopping driving of the power supply circuit. When the periodic status acquisition timing is set to an hour unit such as one hour, 12 hours, 24 hours or the like, the printer 14 that is put into a dormant state by the sleep function can be suppressed from frequently returning to a state where a drive circuit outputs a DC voltage. As a result, the consumption of the battery 50 is suppressed, and discomfort of a user of a printer can be suppressed. The discomfort of the user of the printer 14 means that even though the printer 14 is put into the dormant state, the dormant state soon returns to the drive state.

When it is determined that the periodic status acquisition timing has come (step S71: Yes), the second program 34 of the printer 14 determines whether a transmission timing of transmitting an HTTP request to the external mediation apparatus 12 has come (step S74). When it is determined that the transmission timing has not come (step S74: No), the second program 34 again executes the processing of step S71. On the other hand, when it is determined that the transmission timing has come (step S74: Yes), the second program 34 sets the dormancy prohibition flag Fs to 1 (step S6), and determines whether the status information to be periodically acquired is acquired from each unit in the printer 14 (step S75).

When it is determined that the status information is not acquired (step S75: No), the second program 34 of the printer 14 generates third error information indicating that the status information is not acquired, and transmits an HTTP request including the generated third error information to the external mediation apparatus 12 (step S76). Note that, the third error information is an example of the state information, and the processing that is executed in step S76 is an example of the transmitting of the state information. The processing that is executed in step S76 is also referred to as state information transmission processing. The HTTP request including the third error information transmitted at this time may also be included in an HTTP request separate from the HTTP request that is periodically transmitted. That is, when it is determined that the status information is not acquired, the second program 34 may transmit the HTTP request including the third error information to the external mediation apparatus 12 without waiting for the transmission timing. When the HTTP request including the third error information is received (step S76), the first program 24 transmits a response, which indicates that the HTTP request is received, to the printer 14 (step S78).

Also, when the HTTP request including the third error information is received (step S76), the first program 24 of the external mediation apparatus 12 decides not to update the correspondence database, and also decides not to transmit information corresponding to the third error information to the management server 11 (step S77). That is, in a case where the printer 14 does not execute an instruction corresponding to the first instruction command input from the management server 11, the first program 24 generates and transmits the second error information to the management server 11, as described above. On the other hand, in a case where the status information tried to be periodically acquired cannot be acquired, the first program 24 does not transmit the third error information to the management server 11. Thereby, the error information is suppressed from being frequently transmitted to the management server 11.

On the other hand, when it is determined in step S75 that the status information is acquired (step S75: No), the second program 34 of the printer 14 transmits an HTTP request including the status information to the external mediation apparatus 12 (step S79). This request is also referred to as "UpdateDevice", and is to transmit, when a state of the printer 14 changes, the status information about the changed state to the external mediation apparatus 12. Note that, the status information at this time is an example of the state information, and the processing that is executed in step S79 is an example of the transmitting of the state information. The processing that is executed in step S79 is also referred to as state information transmission processing. That is, due to the dormancy prohibition flag Fs being set to 1 as described above, the dormancy is prohibited at least while the state information transmission processing is executed. After transmitting the HTTP request, the second program 34 of the printer 14 sets the execution history flag Fa to 1 (step S7). Note that, the HTTP request including the status information may also be included in an HTTP request separate from the HTTP request that is periodically transmitted. That is, when it is determined that the status information is received, the second program 34 may transmit the HTTP request including the status information to the external mediation apparatus 12 without waiting for the transmission timing.

When the HTTP request including the status information transmitted from the printer 14 is received (step S79), the first program 24 of the external mediation apparatus 12 transmits an HTTP response, which indicates that the HTTP request is received, to the printer 14 (step S80). This response is also referred to as "BrResponseBasicInfo". After receiving the HTTP response (step S80), the second program 34 of the printer 14 returns the dormancy prohibition flag Fs to 0 (step S8).

Also, when the HTTP request including the status information is received (step S79), the first program 24 of the external mediation apparatus 12 updates the items of the correspondence database with the received status information (step S81). Also, the first program 24 updates the item "update date and time" of the correspondence database with date and time at which the HTTP request including the status information is received. Thereby, the administrator of the external mediation apparatus 12 can check the item "update date and time" and recognize date and time at which the status information is updated and the latest date and time at which communication with the printer 14 could be performed by displaying the correspondence database on the display of the external mediation apparatus 12.

Then, the first program 24 of the external mediation apparatus 12 transmits a command having the updated status information and update date and time as ancillary information to the management server 11 (step S82). When the command having the status information and update date and time as ancillary information is received (step S82), the management server 11 stores the received status information and update date and time in the memory (not shown), and transmits a response, which indicates that the status information and update date and time are received, to the external mediation apparatus 12 (step S83). Therefore, the administrator can check the latest date and time at which the status information is received by displaying, on the display of the external mediation apparatus 12, the information stored in the management server 11 with the browser or displaying, on the display, the correspondence database stored in the memory 22 of the external mediation apparatus 12.

<Status Reporting by Instruction From Management Server>

That is, a case is described in which the instruction to the printer 14 by the first instruction command transmitted by the management server 11 is an instruction to request transmission of the status information of the printer 14. In this case, the first program 24 of the external mediation apparatus 12 transmits the status information that is periodically acquired to the management server 11, as a response to the first instruction command. An example is described with reference to FIGS. 4, 6A and 6B.

Figure 4:
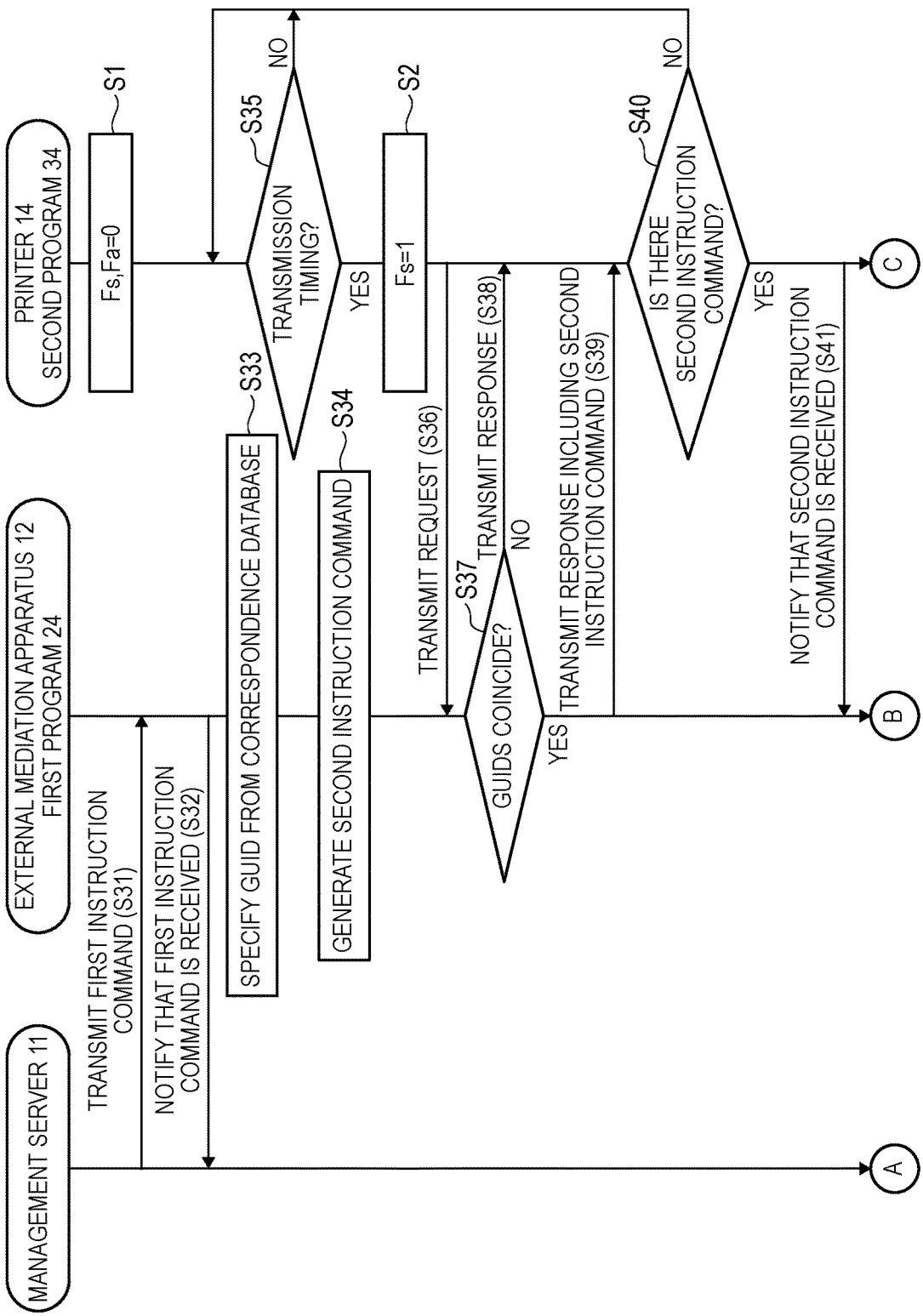
FIG. 4 depicts processing that is executed in the management server, the external mediation apparatus, and the printer when causing the printer to execute an instruction transmitted from the management server.

In FIG. 4, after executing step S31 to step S38, step S1 and step S2, the second program 34 of the printer 14 receives, from the external mediation apparatus 12, a second instruction command to request that the status information of the printer 14 should be returned (step S39). This response is also referred to as "StatusCode", and is an example of the processing execution instruction to instruct the printer 14 to execute desired processing. The processing that is executed in step S39 is an example of the receiving of the processing execution instruction. The processing that is executed in step S39 is also referred to as instruction receiving processing. Then, the second program 34 transmits an HTTP request, which includes a notification indicating that the second instruction command is received, to the external mediation apparatus 12 (step S41).

Figure 6A:
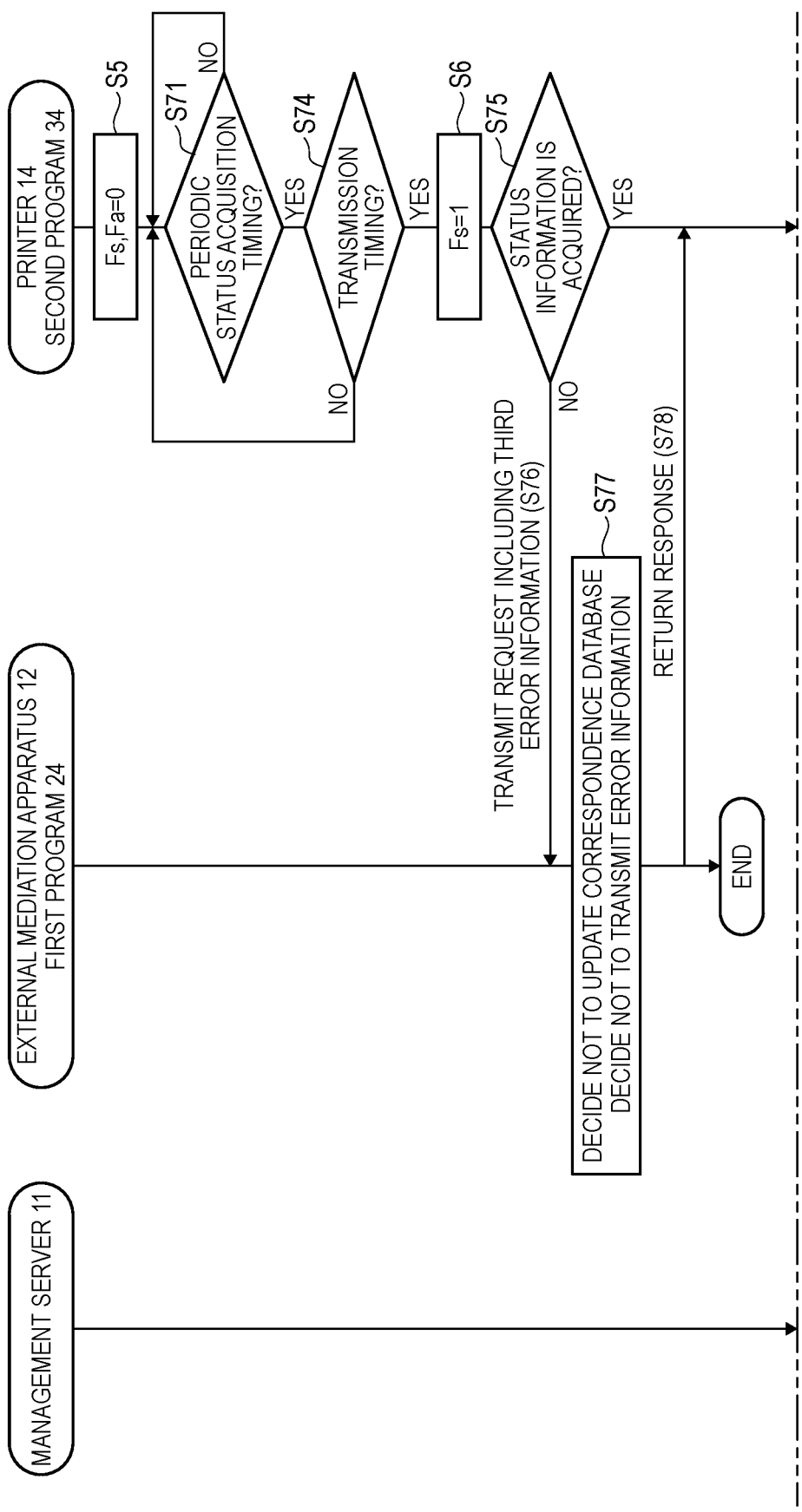
FIGS. 6A and 6B depict processing that is executed in the management server, the external mediation apparatus, and the printer when periodically reporting a status without an instruction from the management server.

Then, shifting to FIG. 6A, the second program 34 stands by until the periodic status acquisition timing comes (step S71: No).

When it is determined that the periodic status acquisition timing has come (step S71: Yes), the second program 34 of the printer 14 determines whether the transmission timing of transmitting the HTTP request to the external mediation apparatus 12 has come, similar to the above. When it is determined that the transmission timing has come (step S74: Yes), the second program 34 transmits an HTTP request including the status information acquired from each unit in the printer 14 to the external mediation apparatus 12, as a response to the second instruction command, via step SC (step S75, S79). Note that, the acquisition and transmission of the status information from each unit in the printer 14, which is executed at this time, is an example of the executing of the processing corresponding to the received processing execution instruction, and is also referred to as execution processing. After step S79, the second program 34 executes step S7 and step S8, which are the same as described above.

After receiving the HTTP request including the status information and returning the HTTP response (step S80), the first program 24 of the external mediation apparatus 12 updates the correspondence database with the received status information (step S81), and transmits the status information to the management server 11, as a response to the first instruction command (step S82).

The management server 11 receives the status information (step S82), as a response to the transmitted first instruction command, and transmits a response, which indicates that the status information is received, to the external mediation apparatus 12 via the Internet 15 (step S83).

The first program 24 of the external mediation apparatus 12 receives the response indicating that the status information is received (step S83), and ends the processing.

Figure 5:
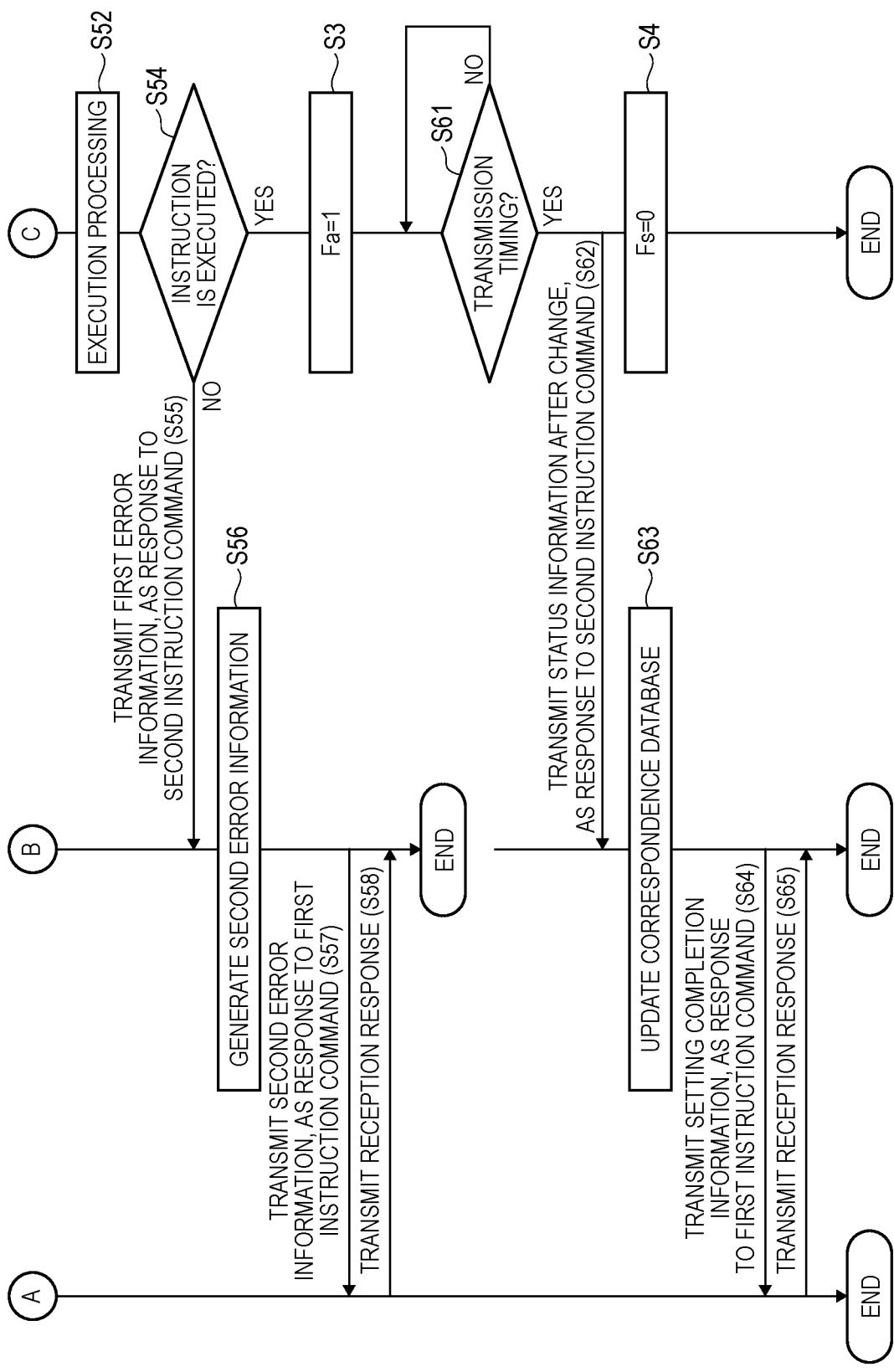
FIG. 5 depicts processing that is executed in the management server, the external mediation apparatus, and the printer when causing the printer to execute an instruction transmitted from the management server.

In each procedure shown in FIGS. 4 and 5, each of the inquiry processing that is executed in step S36, the notification transmission processing that is executed in step S41, the result transmission processing that is executed in step S62, the instruction receiving processing that is executed in step S39, and the execution processing that is executed in step S52 and the like is an example of the periodic information processing. That is, the periodic information processing includes at least one of the processing in which the printer 14 transmits the information to the external mediation apparatus 12, such as the inquiry processing, the notification transmission processing, the result transmission processing and the like, and the processing in which the printer 14 receives the information from the external mediation apparatus 12, such as the instruction receiving processing. Note that, in the example, the periodic information processing is the periodic processing including both the processing in which the printer 14 transmits the information to the external mediation apparatus 12 and the processing in which the printer 14 receives the information from the external mediation apparatus 12.

<Dormancy Function>

In the above basic configurations and operations, the CPU 41 of the printer 14 of the present embodiment executes the dormancy processing with the main object of suppressing the power consumption. That is, for example, in response to a predetermined time having elapsed since the specific operation mechanism such as the print engine 51, the communication I/F 45 and the like became a non-operating state, the printer 14 is switched to a dormant state, i.e., so-called sleep state. That is, although not shown in FIG. 1, the printer 14 includes a power supply circuit configured to drive the print engine 51 and to charge the battery 50. The power supply circuit is configured to convert and output a commercial input AC voltage into a DC voltage. The second program 34 of the printer 14 has a function of stopping driving of the power supply circuit, i.e., executing the dormancy processing. In the meantime, while the dormancy processing is executed by stopping the driving of the power supply circuit, the printer 14 cannot perform communication with the external mediation apparatus 12. The detailed processing including the dormancy processing, which is executed by the second program 34, is described with reference to a flowchart shown in FIG. 7. Note that, the processing shown in FIG. 7 is executed by the second program 34 of the printer 14 in parallel with and separately from the processing shown in FIGS. 4 to 6B.

That is, the second program 34 of the printer 14 determines whether the non-operating state of the specific operation mechanism provided in the printer 14 continues for a preset predetermined time (step S110). The specific operation mechanism is, for example, the print engine 51, the communication 45 and the like. Also, in this example, the predetermined time is 10 minutes. When it is determined that the non-operating state continues for 10 minutes (step S110: Yes), the second program 34 of the printer 14 determines whether the dormancy prohibition flag Fs is 1 (step S120). When it is determined that the dormancy prohibition flag Fs is 1 (step S120: Yes), the second program 34 of the printer 14 returns to step S110 to repeat the same determination. On the other hand, when it is determined that the dormancy prohibition flag Fs is 0 (step S120: No), the second program 34 executes the dormancy processing.

Then, the second program 34 of the printer 14 determines whether a predetermined returning operation for releasing the dormant state due to the dormancy processing is performed (step S140). The returning operation is a predetermined appropriate operation on an appropriate operation unit such as a button provided on the printer 14, for example. The second program 34 continues the dormant state until the returning operation is performed (step S140: No). When it is determined that the returning operation is performed (step S140: Yes), the second program 34 ends the dormant state of the printer 14, returns the printer to a usual state where it is possible to perform communication with the external mediation apparatus 12 (step S150), and ends the processing.

As described in the above processing, even in a case where the non-operating state of the specific operation mechanism continues for the predetermined time (step S110: Yes), while the dormancy prohibition flag Fs is 1 (step S120: Yes), the dormancy processing of step S130 is not executed. As a result, for example, in the series of processing shown in FIGS. 4 and 5, the dormancy processing is prohibited after the dormancy prohibition flag Fs is set to 1 in step S2 until the dormancy prohibition flag Fs returns to 0 in step S4. Also, for example, in the series of processing shown in FIGS. 6A and 6B, the dormancy processing is prohibited after the dormancy prohibition flag Fs is set to 1 in step S6 until the dormancy prohibition flag Fs returns to 0 in step S8. That is, in the processing of each procedure shown in FIG. 7, the processing that is executed in step S120 is an example of the prohibiting of the switching of the printing apparatus to the dormant state during the executing of the periodic information processing and is also an example of the prohibiting of the switching of the printing apparatus to the dormant state during the transmitting of the state information, the processing that is executed in step S130 is an example of the switch of the printing apparatus to a dormant state, and the processing that is executed in step S150 is an example of the returning of the printing apparatus to a usual state.

<Effects of Embodiment>

As described above, in the present embodiment, the second program 34 of the printer 14 executes the dormancy processing, and in response to the predetermined time having elapsed since the specific operation mechanism became the non-operating state, the printer 14 is switched to the dormant state (step S130). At this time, the second program 34 prohibits the dormancy processing so as to prohibit switching of the printing apparatus to the dormant state (step S120) during execution of the periodic information processing such as the inquiry processing (step S36), the instruction receiving processing (step S39), the execution processing (step S52), and the result transmission processing (step S62). Thereby, it is possible to avoid adverse effects that the printer is switched to the dormant state during the execution of the periodic processing and the variety of periodic processing may not be normally executed. As a result, while securely normally executing the periodic processing, it is possible to suppress the increase in power consumption to the minimum necessary.

Also, in the present embodiment, in particular, the second program 34 returns the printer 14 to the usual state, based on the predetermined returning operation, after the switching to the dormant state by the dormancy processing (step S150). Thereby, it is possible to return the printer 14 once switched to the dormant state to the usual state by the operator's intentional returning operation, thereby putting the printer 14 into a state where the printer can perform communication with the external mediation apparatus 12.

Also, in the present embodiment, in particular, as described above, the second program 34 prohibits the dormancy processing at least after the inquiring of whether there is a processing execution instruction (step S36) is executed. Thereby, it is possible to normally execute inquiring the external mediation apparatus 12 whether there is the processing execution instruction, securely without being disturbed by the dormancy.

Also, in the present embodiment, in particular, as described above, the second program 34 prohibits the dormancy processing at least during the receiving of the processing execution instruction (step S39) and the executing of processing corresponding to the received processing execution instruction (step S52). Thereby, it is possible to normally execute the receiving of the processing execution instruction from the external mediation apparatus 12 and executing of the processing corresponding to the processing execution instruction, securely without being disturbed by the dormancy.

Also, in the present embodiment, in particular, as described above, the second program 34 prohibits the dormancy processing at least up to the timing at which the execution result is transmitted (step S62). Thereby, it is possible to normally execute the transmission of the execution result of the processing instructed in the execution processing, securely without being disturbed by the dormancy.

Also, in the present embodiment, when the state of the printing apparatus changes, such as change in diverse settings of the printer 14 and occurrence of an error, the second program 34 of the printer 14 transmits the status information about the changed state to the external mediation apparatus 12 (step S79). If the printer 14 turns into the dormant state upon or during execution of the processing, the transmission of the status information is not normally executed, so that the administrator may not perceive a correct state of the printer 14. Therefore, in the present embodiment, in particular, as described above, the dormancy processing is prohibited during the transmitting of the state information. Thereby, it is possible to avoid the above adverse effects, thereby executing securely and normally the transmission of the status information.

The present disclosure is not limited to the above embodiment and can be diversely modified without departing from the gist and technical spirit thereof. In the below, modified embodiments are described. The parts equivalent to the above embodiment are denoted with the same reference signs, and the descriptions thereof are omitted or simplified as appropriate.

(1) Extension of Dormancy Processing

For example, when the periodic information processing such as the inquiry processing (step S36), the instruction receiving processing (step S39), the execution processing (step S52), the result transmission processing (step S62) and the like is executed, the administrator may immediately check in real time the result of the information transmission and reception between the printer 14 and the external mediation apparatus 12 through the management server 11 and further issue a next processing execution instruction, based on a result of the check. Also, for example, when the state information transmission processing such as transmitting of the third error information (step S76), transmitting of the status information (step S79) and the like is executed, the administrator may immediately issue in real time the processing execution instruction, based on the change in state of the printer 14. The present modified embodiment is to cope with these situations. That is, even after the prohibiting of the dormancy processing described in step S120 of FIG. 7 has finished, the prohibiting of the dormancy processing is extended for a predetermined time period. The detailed processing by the second program 34 in the present modified embodiment is described with reference to a flowchart shown in FIG. 8 corresponding to FIG. 7.

Figure 7:
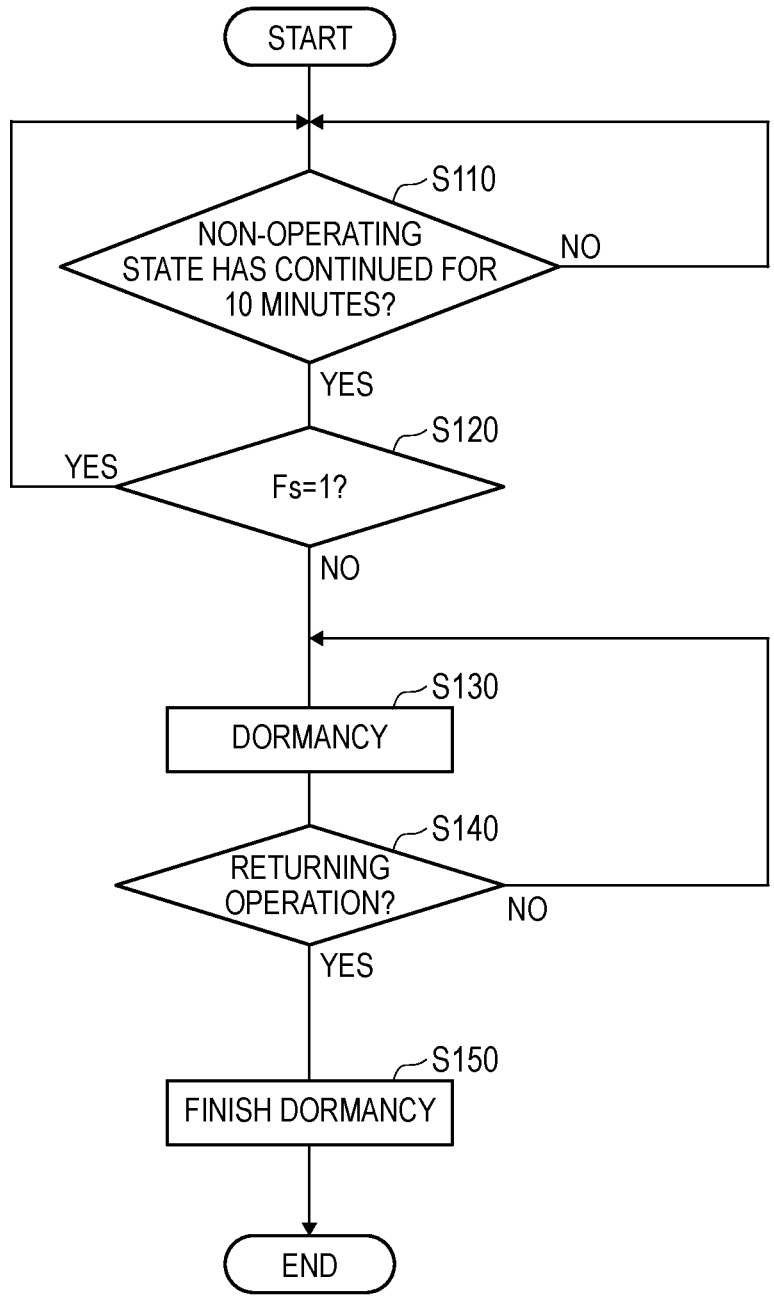
FIG. 7 is a flowchart depicting detailed procedures of dormancy processing that is executed by a second program of the printer.
Figure 8:
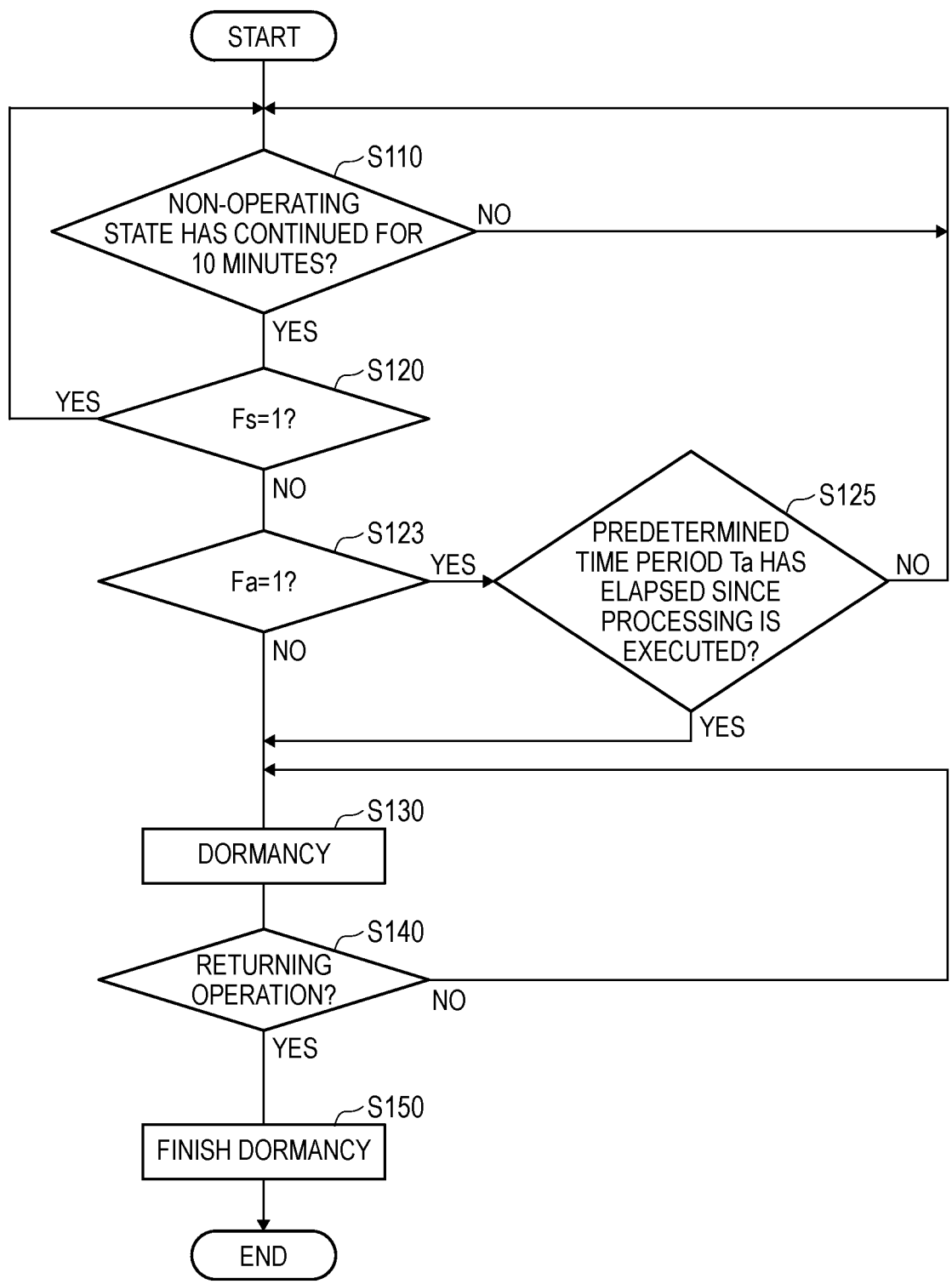
FIG. 8 is a flowchart depicting detailed procedures of the dormancy processing that is executed by the second program of the printer, in a modified embodiment where the dormancy processing is extended.

In FIG. 8, in the present modified embodiment, the second program 34 of the printer 14 further executes step S123 and step S125, in addition to each procedure shown in FIG. 7. That is, when it is determined in step S120 that the dormancy prohibition flag Fs is 0 (step S120: No), the second program 34 determines whether the execution history flag Fa is 1 (step S123). When it is determined that the execution history flag Fa is 0 (step S123: No), the second program 34 performs the dormancy processing (step S130), and when it is determined that the execution history flag Fa is 1, the second program 34 determines whether a predetermined time period Ta has elapsed since the execution of the processing immediately before (step S52 or step S75) finished (step S125). The predetermined time period Ta is an example of the first predetermined time period, and is also an example of the third predetermined time period. The second program 34 of the printer 14 returns to step S110 and repeats the same determination until the predetermined time period Ta has elapsed (step S125: No), and performs the dormancy processing (step S130) when the predetermined time period Ta has elapsed (step S125: Yes).

As described in the above flow of the processing, after the non-operating state of the specific operation mechanism continues for the predetermined time (step S110: Yes) and the dormancy prohibition is made with the dormancy prohibition flag Fs=1, even though the dormancy prohibition flag Fs returns to 0 (step S120: No), in a case where the execution history flag Fa is set to 1 (S123: YES), the dormancy processing of step S130 is not executed until the predetermined time period Ta has elapsed. As a result, for example, in the series of processing shown in FIGS. 4 and 5, even though the dormancy prohibition flag Fs returns to 0 in step S4 after the dormancy prohibition flag Fs is set to 1 in step S2, since the execution history flag Fa is set to 1 in step S3, the prohibiting of the dormancy processing is extended until the predetermined time period Ta has elapsed since the processing of step S52 is completed. Also, for example, in the series of processing shown in FIGS. 6A and 6B, even though the dormancy prohibition flag Fs returns to 0 in step S8 after the dormancy prohibition flag Fs is set to 1 in step S6, since the execution history flag Fa is set to 1 in step S7, the prohibiting of the dormancy processing is extended until the predetermined time period Ta has elapsed since the processing of step S76 or step S79 is completed. That is, in the processing of each procedure shown in FIG. 8, the processing that is executed in step S120 is an example of the prohibiting of the switching of the printing apparatus to the dormant state during the executing of the periodic information processing and is also an example of the prohibiting of the switching of the printing apparatus to the dormant state during the transmitting of the state information, and the processing that is executed in step S123 and step S125 is an example of the prohibiting of the switching of the printing apparatus to the dormant state for a first predetermined time period and is also an example of the prohibiting of the switching of the printing apparatus to the dormant state for a third predetermined time period. Also, similar to FIG. 7, the processing that is executed in step S130 is an example of the switching of the printing apparatus to a dormant state, and the processing that is executed in step S150 is an example of the returning of the printing apparatus to a usual state.

Also, in a case where the predetermined time period Ta is applied to the series of processing shown in FIGS. 4 and 5, for example, the value thereof may be varied according to the content of the execution processing of step S52. For example, as shown with "Execution of Action" in FIG. 9, in a case where the content of the processing in step S52 is to update the software content, the predetermined time period Ta may be set to 10 [minutes], in a case where the content of the processing in step S52 is to change the variety of settings of the printer 14, the predetermined time period Ta may be set to 3 [minutes], and in a case where the content of the processing in step S52 is to perform printing by the print engine 51, the predetermined time period Ta may be set to 5 [minutes]. Note that, in this example, in a case where the content of the processing in step S52 is to restart the printer 14, the predetermined time period Ta is set to 0 [minute], i.e., the prohibition of the dormancy processing is not extended.

Figure 6B:
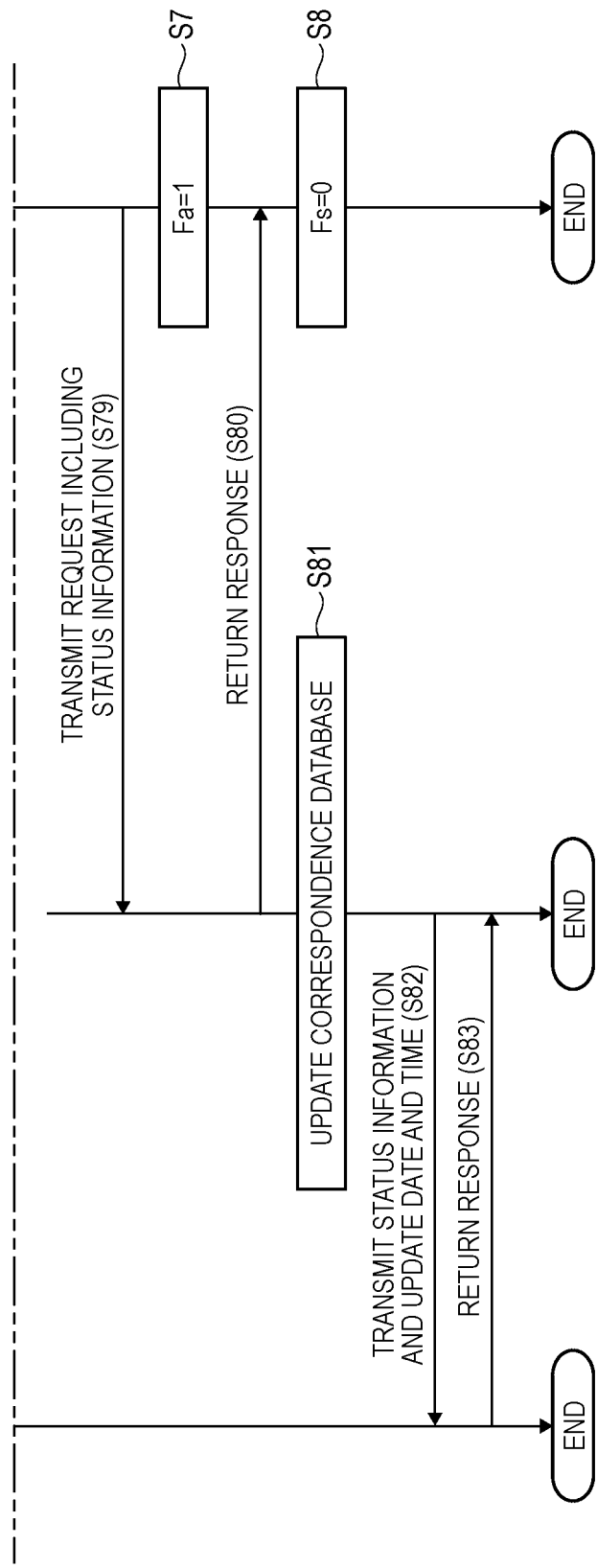

Similarly, in a case where the predetermined time period Ta is applied to the series of processing shown in FIGS. 6A and 6B, the value thereof may be varied according to the content of the third error information transmitted in step S76 or the status information transmitted in step S79, For example, as shown with "UpdateDevice" in FIG. 9, in a case where the content of the information transmitted in step S76 or step S79 is to change the variety of settings of the printer 14, the predetermined time period Ta may be set to 3 [minutes], and in a case where the content of the information transmitted in step S76 or step S79 indicates error occurrence in the printer 14, the predetermined time period Ta may be set to 10 [minutes]. Note that, in this example, in a case where the content of the information indicates lowering in remaining amount of the battery, the predetermined time period Ta is set to 0 [minute], i.e., the prohibition of the dormancy processing is not extended.

<Effects of Modified Embodiment>

Also in the present modified embodiment, the similar effects to the above embodiment are obtained. Further, in the present modified embodiment, in particular, the dormancy processing in step S130 is not executed until the dormancy prohibition flag Fs is set to 1 in step S120, and the dormancy processing in step S130 is further prohibited for the predetermined time period Ta since the dormancy prohibition flag Fs is set to 1. Thereby, it is possible to maintain real-time performance for the administrator and to secure the convenience.

At this time, a degree of necessity of the real-time performance for the administrator is different depending on the content of information transmitted and received immediately before between the printer 14 and the external mediation apparatus 12, the content of processing executed immediately before, the content of the third error information or the status information of the printer 14 whose state has changed, and the like. Therefore, in the present modified embodiment, in particular, the predetermined time period Ta is set variable, so that it is possible to optimize a length of time for suppressing the dormancy in step S130 and to improve the usability for the administrator.

(2) Autonomous Return From Dormancy

For example, after the dormancy is made by the dormancy processing (step S130), the inquiry processing (step S36), the instruction receiving processing (step S39), the execution processing (step S52), the result transmission processing (step S62), the state information transmission processing (step S76, step S79) and the like cannot be executed. The present modified embodiment is to cope with this situation. That is, even though the dormancy processing in step S130 of FIG. 7 starts and the returning operation of step S140 is not performed, when a predetermined time period has elapsed since the dormancy, the dormancy is ended and the printer is returned to the usual state. The detailed processing by the second program 34 in the present modified embodiment is described with reference to a flowchart shown in FIG. 10 corresponding to FIG. 7.

Figure 10:
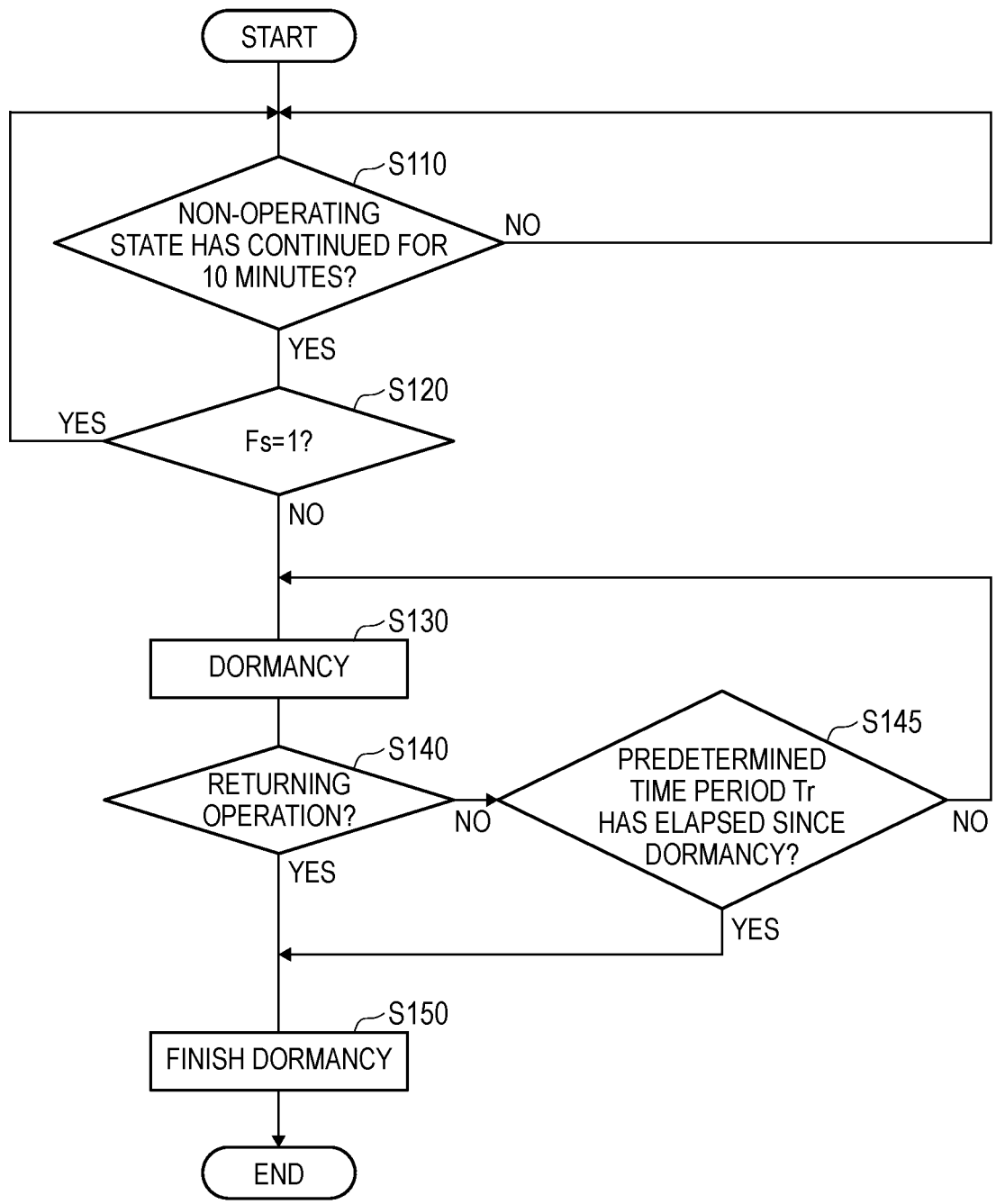
FIG. 10 is a flowchart depicting detailed procedures of the dormancy processing that is executed by the second program of the printer, in a modified embodiment where autonomous return from dormancy is performed.

In FIG. 10, in the present modified embodiment, the second program 34 of the printer 14 further executes step S145, in addition to each procedure shown in FIG. 7. That is, in a case where it is determined in step S140 that the returning operation is not performed (step S140: No), the second program 34 determines whether a predetermined time period Tr has elapsed after the printer 14 is switched to the dormant state in step S130 (step S145). The predetermined time period Tr is an example of the second predetermined time period, and is also an example of the fourth predetermined time period. The second program 34 of the printer 14 returns to step S130 to continue the dormancy of the printer 14 until the predetermined time period Tr has elapsed (step S145: No). When the predetermined time period Tr has elapsed (step S145: Yes), the second program 34 ends the dormant state to return the printer to the usual state (step S150).

As described in the above flow of the processing, even when the returning operation is not performed (step S140: No) after the dormancy of the printer 14 (step S130), when the predetermined time period Tr has elapsed after the dormancy processing is executed, the dormancy is finished. That is, in the processing of each procedure shown in FIG. 10, the processing that is executed in step S145 is an example of the returning of the printing apparatus to a usual state in which the printing apparatus is capable of performing communication with the external mediation apparatus when a second predetermined time period has elapsed since the printing apparatus was switched to the dormant state, and is also an example of the returning of the printing apparatus to a usual state in which the printing apparatus is capable of performing communication with the external mediation apparatus when a fourth predetermined time period has elapsed since the printing apparatus was switched to the dormant state. Also, similar to FIG. 7, the processing that is executed in step S120 is an example of the prohibiting of the switching of the printing apparatus to the dormant state during the executing of the periodic information processing and is also an example of the prohibiting of the switching of the printing apparatus to the dormant state during the transmitting of the state information, the processing that is executed in step S130 is an example of the switching of the printing apparatus to a dormant state, and the processing that is executed in step S150 is an example of the return the printing apparatus to a usual state in which the printing apparatus is capable of performing communication with the external mediation apparatus based on a predetermined returning operation after the printing apparatus is switched to the dormant state.

Also, in a case where the predetermined time period Tr is applied to the series of processing shown in FIGS. 4 and 5, for example, the value thereof may be varied according to the content of the execution processing of step S52. For example, as shown with "Execution of Action" in FIG. 11, in a case where the content of the processing in step S52 is to update the software content, the predetermined time period Tr may be set to 1 [minute], in a case where the content of the processing in step S52 is to change the variety of settings of the printer 14, the predetermined time period Tr may be set to 3 [minutes], and in a case where the content of the processing in step S52 is to perform printing by the print engine 51, the predetermined time period Tr may be set to 10 [minutes]. Note that, in this example, in a case where the content of the processing in step S52 is to restart the printer 14, the predetermined time period Tr is set to 0 [minute], i.e., the dormancy is immediately finished and the printer is returned to the usual state even though the returning operation is not performed.

Similarly, in a case where the predetermined time period Tr is applied to the series of processing shown in FIGS. 6A and 6B, the value thereof may be varied according to the content of the third error information transmitted in step S76 or the status information transmitted in step S79. For example, as shown with "UpdateDevice" in FIG. 11, in a case where the content of the information transmitted in step S76 or step S79 is to change the variety of settings of the printer 14, the predetermined time period Tr may be set to 3 [minutes], in a case where the content of the information transmitted in step S76 or step S79 indicates error occurrence in the printer 14, the predetermined time period Tr may be set to 1 [minute], and in a case where the content of the information transmitted in step S76 or step S79 indicates lowering in remaining amount of the battery, the predetermined time period Tr may be set to 10 [minutes].

<Effects of Modified Embodiment>

Also in the present modified embodiment, the similar effects to the above embodiment are obtained. Also, in the present modified embodiment, when the predetermined time period Tr has elapsed after the printer 14 is switched to the dormant state in step S130, the printer 14 is autonomously returned to the usual state. Thereby, it is possible to avoid the adverse effects that the variety of processing cannot be executed due to the dormancy, and to enable the variety of processing to be executed, so that it is possible to maintain the real-time performance for the administrator and to secure the convenience.

At this time, a degree of necessity of the real-time performance for the administrator is different depending on the content of information transmitted and received immediately before between the printer 14 and the external mediation apparatus 12, the content of processing executed immediately before, the content of the third error information or the status information of the printer 14 whose state has changed, and the like. Therefore, in the present modified embodiment, in particular, the predetermined time period Tr is set variable, so that it is possible to optimize a length of time from the dormancy in step S130 to the return and to improve the usability for the administrator.

(3) Others

In the embodiment, the printer 14 transmits the HTTP request and the external mediation apparatus 12 returns the HTTP response, so that the second instruction command is transmitted from the external mediation apparatus 12 to the printer 14 via the firewall. However, other communication protocols may also be used inasmuch as the second instruction command can be transmitted from the external mediation apparatus 12 to the printer 14 via the firewall. For example, a communication protocol conforming to XMP-PoverBOSH may be used between the external mediation apparatus 12 and the printer 14. The second instruction command can be transmitted from the external mediation apparatus 12 to the printer 14 via the firewall by communication in a session established as a session start request of XMPPoverBOSH is transmitted from the external mediation apparatus 12 to the printer 14 and the external mediation apparatus 12 returns a session start response.

Also, in the embodiment, the printer 14 that is a printing apparatus has been exemplified as the electronic device that is a management target by the management server 11. However, the present disclosure is not limited thereto. That is, the present disclosure can also be applied to a digital camera, a personal computer, a measurement device, a clock, a barcode reader, a scanner, a sewing machine, other information devices/communication devices/control devices/diverse machines and the like inasmuch as they are electronic devices capable of performing communication with the external mediation apparatus 12. Also in this case, the similar effects can be achieved.

In the embodiment, the sequences and flowcharts shown in FIGS. 3 to 7, 8 and 10 are not intended to limit the present disclosure to the procedures shown in the flowcharts. That is, a procedure may be added, deleted, changed and the like without departing from the gist of the disclosure and the technical spirit.

In addition to the above, the embodiment and each modified embodiment can be used with being combined as appropriate.

Also, although not exemplified in detail, the present disclosure can be implemented with being diversely changed without departing from the spirit thereof.

The present disclosure provides illustrative, non-limiting examples as follows:

According to an aspect of the present disclosure, there is provided a printing apparatus including: a printing unit configured to perform printing on a printing medium; and a controller, wherein the printing apparatus is configured to perform communication with an external mediation apparatus configured to perform communication with a management server via, the Internet, and wherein the controller is configured to: switch the printing apparatus to a dormant state in response to a predetermined time having elapsed since a specific operation mechanism of a plurality of operation mechanisms including the printing unit became a non-operating state, the printing apparatus being incapable of performing communication with the external mediation apparatus in the dormant state; execute periodic information processing including at least one of information transmission to the external mediation apparatus and information reception from the external mediation apparatus; and prohibit the switching of the printing apparatus to the dormant state during the executing of the periodic information processing.

The printing apparatus of the present disclosure is used in a so-called MDM (Mobile Device Management) system. That is, the external mediation apparatus (so-called Device Conductor) is communicatively connected to the management server configured to manage the printing apparatus, via the Internet, and the printing apparatus is communicatively connected to the external mediation apparatus.

The management of the printing apparatus by the management server is performed via the external mediation apparatus. For this reason, the controller performs the periodic processing including at least one of the information transmission to the external mediation apparatus and the information reception from the external mediation apparatus (periodic information processing). Specifically, the periodic information processing includes, for example, inquiry processing of inquiring the external mediation apparatus whether there is a processing execution instruction to instruct execution of desired processing, instruction receiving processing of receiving the processing execution instruction from the external mediation apparatus, execution processing of executing processing corresponding to the processing execution instruction, result transmission processing of transmitting a processing execution result, and the like.

In the meantime, the controller of the printing apparatus executes the dormancy processing with the main object of suppressing the power consumption. That is, for example, in response to the predetermined time having elapsed since a specific operation mechanism such as a printing unit and a communication unit became the non-operating state, the printing apparatus is switched to the dormant state (so-called sleep state).

However, since the dormant state is a state where the printing apparatus is incapable of performing communication with the external mediation apparatus, when the dormancy processing is executed and the printing apparatus is switched to the dormant state upon execution of the periodic information processing or during execution of the periodic information processing, the above diverse periodic processing may not be normally executed. On the other hand, if the dormancy processing is unconditionally suppressed, the power consumption considerably increases.

Therefore, in the aspect of the present disclosure, the controller prohibits the dormancy processing while the periodic information processing is executed, so as to prevent switching to the dormant state. Thereby, it is possible to suppress an increase in power consumption to the minimum necessary while avoiding the adverse effects and securely normally executing the diverse periodic processing.

According to the aspect of the present disclosure, it is possible to suppress an increase in power consumption to the minimum necessary while avoiding the adverse effects of the dormancy processing and securely normally executing the diverse periodic processing.

According to another aspect of the present disclosure, there is provided a non-transitory computer-readable storage medium storing a computer program readable by a computer of an electronic device configured to perform communication with an external mediation apparatus configured to perform communication with a management server via the Internet, the computer program, when executed by the computer, causing the electronic device to perform: switching the electronic device to a dormant state in response to a predetermined time having elapsed since a specific operation mechanism of a plurality of operation mechanisms including a printing unit of the electronic device became a non-operating state, the electronic device being incapable of performing communication with the external mediation apparatus in the dormant state; executing periodic information processing including at least one of information transmission to the external mediation apparatus and information reception from the external mediation apparatus; and prohibiting the switching of the electronic device to the dormant state during the executing of the periodic information processing.

What is claimed is:

1. A printing apparatus comprising:
a printing engine configured to perform printing on a printing medium; and
a controller,
wherein the printing apparatus is configured to perform communication with an external mediation apparatus configured to perform communication with a management server via the Internet, and
wherein the controller is configured to:
switch the printing apparatus to a dormant state in response to a predetermined time having elapsed since a specific operation mechanism of a plurality of operation mechanisms including the printing engine became a non-operating state, the printing apparatus being incapable of performing communication with the external mediation apparatus in the dormant state;
execute periodic information processing including at least one of information transmission to the external mediation apparatus and information reception from the external mediation apparatus; and
prohibit the switching of the printing apparatus to the dormant state during the executing of the periodic information processing.

2. The printing apparatus according to claim 1,
wherein the controller is further configured to:
return the printing apparatus to a usual state in which the printing apparatus is capable of performing communication with the external mediation apparatus based on a predetermined returning operation after the printing apparatus is switched to the dormant state.

3. The printing apparatus according to claim 1,
wherein the periodic information processing includes inquiring the external mediation apparatus whether there is a processing execution instruction to instruct the printing apparatus to execute desired processing, and
wherein the prohibiting of the switching of the printing apparatus to the dormant state during the executing of the periodic information processing includes prohibiting the switching of the printing apparatus to the dormant state at least after the inquiring is executed.

4. The printing apparatus according to claim 1,
wherein the periodic information processing includes:
receiving, from the external mediation apparatus, a processing execution instruction to instruct the printing apparatus to execute desired processing; and
executing processing corresponding to the received processing execution instruction, and
wherein the prohibiting of the switching of the printing apparatus to the dormant state during the executing of the periodic information processing includes prohibiting the switching of the printing apparatus to the dormant state at least during the receiving of the processing execution instruction and the executing of the processing corresponding to the received processing execution instruction.

5. The printing apparatus according to claim 4,
wherein the periodic information processing further includes transmitting an execution result of the processing corresponding to the received processing execution instruction, and
wherein the prohibiting of the switching of the printing apparatus to the dormant state during the executing of the periodic information processing includes prohibiting the switching of the printing apparatus to the dormant state at least up to a timing at which the execution result is transmitted.

6. The printing apparatus according to claim 4,
wherein the controller is further configured to:
prohibit the switching of the printing apparatus to the dormant state for a first predetermined time period, the first predetermined period corresponding to a content of the executed processing corresponding to the received processing execution instruction, and the prohibiting of the switching of the printing apparatus to the dormant state for the first predetermined time period being executed after the prohibiting of the switching of the printing apparatus to the dormant state during the executing of the periodic information processing has finished.

7. The printing apparatus according to claim 6,
wherein the controller is further configured to:
return the printing apparatus to a usual state in which the printing apparatus is capable of performing communication with the external mediation apparatus when a second predetermined time period has elapsed since the printing apparatus was switched to the dormant state after (i) the prohibiting of the switching of the printing apparatus to the dormant state during the executing of the periodic information processing had finished or (ii) the prohibiting of the switching of the printing apparatus to the dormant state for the first predetermined time period had finished.

8. The printing apparatus according to claim 7,
wherein the first predetermined time period or the second predetermined time period is set variable according to a content of the executed processing corresponding to the received processing execution instruction.

9. The printing apparatus according to claim 1,
wherein the controller is further configured to:
transmit, in a case where a state of the printing apparatus changes, state information about the changed state to the external mediation apparatus; and
prohibit the switching of the printing apparatus to the dormant state during the transmitting of the state information.

10. The printing apparatus according to claim 9,
wherein the controller is further configured to:
prohibit the switching of the printing apparatus to the dormant state for a third predetermined time period, the third predetermined period corresponding to a content of the transmitted state information, and the prohibiting of the switching of the printing apparatus to the dormant state for the third predetermined time period being executed after the prohibiting of the switching of the printing apparatus to the dormant state during the transmission of the state information has finished.

11. The printing apparatus according to claim 10,
wherein the controller is further configured to
return the printing apparatus to a usual state in which the printing apparatus is capable of performing communication with the external mediation apparatus when a fourth predetermined time period has elapsed since the printing apparatus was switched to the dormant state after (i) the prohibiting of the switching of the printing apparatus to the dormant state during the transmission of the state information had finished or (ii) the prohibiting of the switching of the printing apparatus to the dormant state for the third predetermined time period had finished.

12. The printing apparatus according to claim 9,
wherein the third predetermined time period or the fourth predetermined time period is set variable according to a content of the transmitted state information.

13. A non-transitory computer-readable storage medium storing a computer program readable by a computer of an electronic device configured to perform communication with an external mediation apparatus configured to perform communication with a management server via the Internet, the computer program, when executed by the computer, causing the electronic device to perform:
switching the electronic device to a dormant state in response to a predetermined time having elapsed since a specific operation mechanism of a plurality of operation mechanisms including a printing engine of the electronic device became a non-operating state, the electronic device being incapable of performing communication with the external mediation apparatus in the dormant state;

executing periodic information processing including at least one of information transmission to the external mediation apparatus and information reception from the external mediation apparatus; and prohibiting the switching of the electronic device to the dormant state during the executing of the periodic information processing.

* * * * *